United States Patent
Saito et al.

(10) Patent No.: US 12,189,339 B2
(45) Date of Patent: Jan. 7, 2025

(54) POINTER DEVICE, ELECTRONIC WATCH, CONTROL METHOD FOR POINTER DEVICE, AND RECORDING MEDIUM

(71) Applicant: CASIO COMPUTER CO., LTD., Tokyo (JP)

(72) Inventors: Yuta Saito, Tachikawa (JP); Yohei Kawaguchi, Akishima (JP); Fumiaki Ochiai, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 787 days.

(21) Appl. No.: 16/952,892

(22) Filed: Nov. 19, 2020

(65) Prior Publication Data

US 2021/0149344 A1  May 20, 2021

(30) Foreign Application Priority Data

Nov. 20, 2019 (JP) ................. 2019-209405

(51) Int. Cl.
*G04C 3/14* (2006.01)
*G04B 19/02* (2006.01)
(Continued)

(52) U.S. Cl.
CPC ............. *G04B 19/02* (2013.01); *G04C 3/008* (2013.01); *G04C 3/14* (2013.01); *H02P 8/02* (2013.01); *G04C 3/143* (2013.01)

(58) Field of Classification Search
CPC .......... G04G 5/027; G04G 3/022; G04C 3/14; G04C 3/143; G04B 19/02; H02P 8/02
See application file for complete search history.

(56) References Cited

U.S. PATENT DOCUMENTS

| 4,404,510 A * | 9/1983 | Nakajima | G04C 3/14 968/491 |
| 2009/0296534 A1* | 12/2009 | Kojima | G04C 3/14 368/185 |

(Continued)

FOREIGN PATENT DOCUMENTS

| CN | 106849778 A | 6/2017 |
| JP | S56-110073 A | 9/1981 |

(Continued)

OTHER PUBLICATIONS

The First Office Action dated Nov. 1, 2021 received in Chinese Patent Application No. CN 202011308651.9 together with an English language translation.

(Continued)

*Primary Examiner* — Sean Kayes
(74) *Attorney, Agent, or Firm* — Scully, Scott, Murphy & Presser, P.C.

(57) ABSTRACT

An electronic watch includes a pointer; a stepping motor including a coil and configured to drive the pointer; a driving circuit configured to drive the stepping motor; an A/D converter configured to detect electromotive force generated in the coil due to an impact; and a CPU configured to control driving of the driving circuit. The CPU determines a direction in which the pointer is likely to be shifted, based on the electromotive force detected by the A/D converter, determines whether the pointer is shifted due to the impact, and upon determining that the pointer is shifted, corrects a position of the pointer in accordance with the direction in which the pointer is likely to be shifted.

14 Claims, 38 Drawing Sheets

(51) Int. Cl.
    *G04C 3/00*           (2006.01)
    *H02P 8/02*           (2006.01)

(56)                 References Cited

U.S. PATENT DOCUMENTS

| | | | |
|---|---|---|---|
| 2011/0198950 A1* | 8/2011 | Zhao | H02K 37/20 |
| | | | 310/49.46 |
| 2017/0141710 A1* | 5/2017 | Klopfenstein | G04C 3/143 |
| 2018/0088533 A1* | 3/2018 | Saito | H02P 8/16 |
| 2018/0246471 A1* | 8/2018 | Takyoh | H02P 8/16 |

FOREIGN PATENT DOCUMENTS

| | | |
|---|---|---|
| JP | 2005-172677 A | 6/2005 |
| JP | 2009-156787 A | 7/2009 |
| JP | S54-021873 A | 2/2014 |
| JP | 2017-173037 A | 9/2017 |
| WO | 2007/102412 A1 | 9/2007 |

OTHER PUBLICATIONS

Notice of Reasons for Refusal dated Sep. 28, 2021 received in Japanese Patent Application No. JP 2019-209405 together with an English language translation.

* cited by examiner

TOP
LEFT ←→ RIGHT
BOTTOM

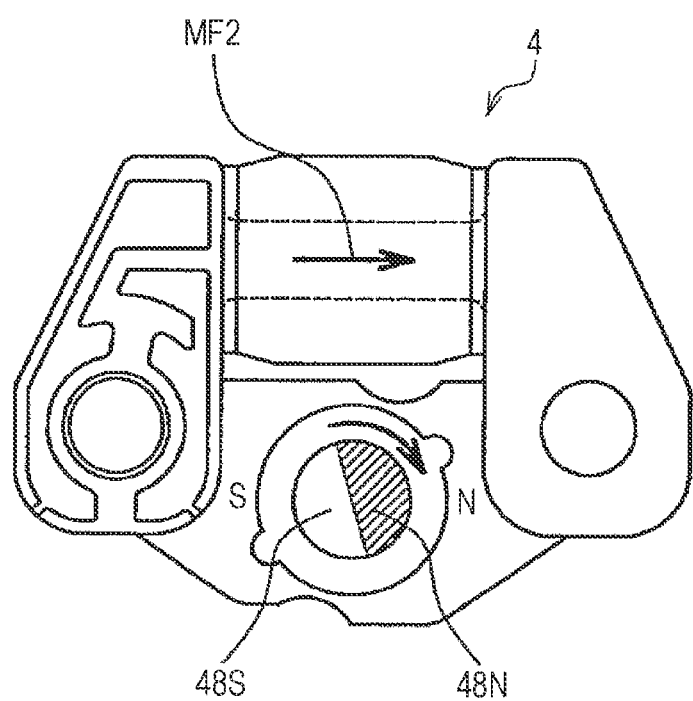
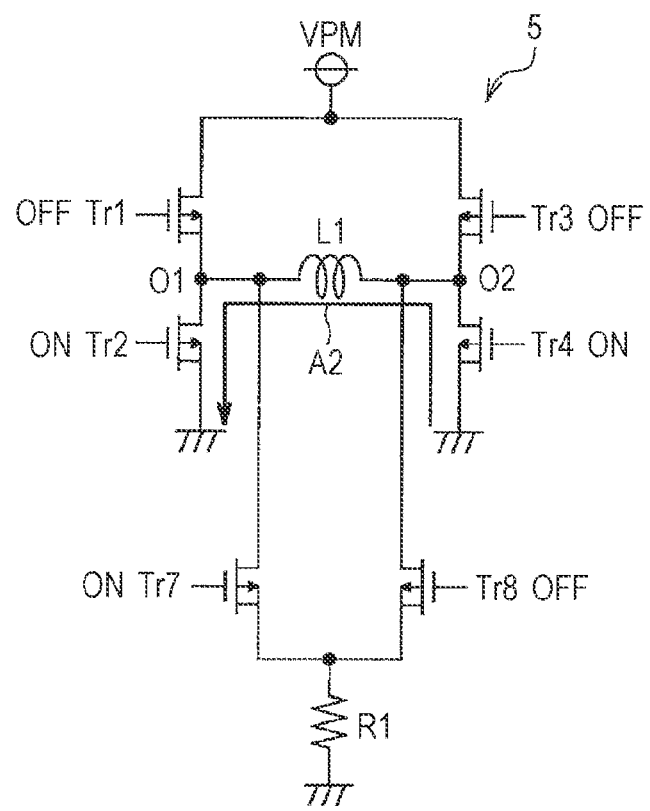
FIG. 5A

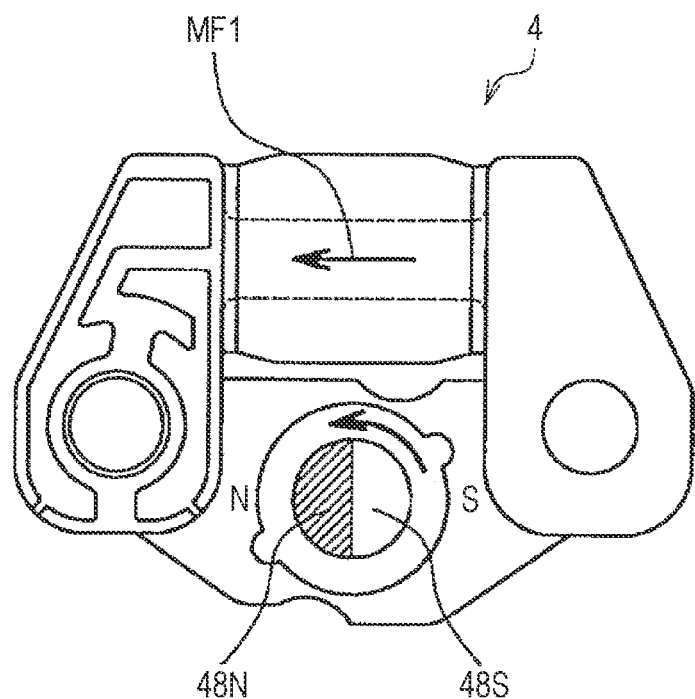
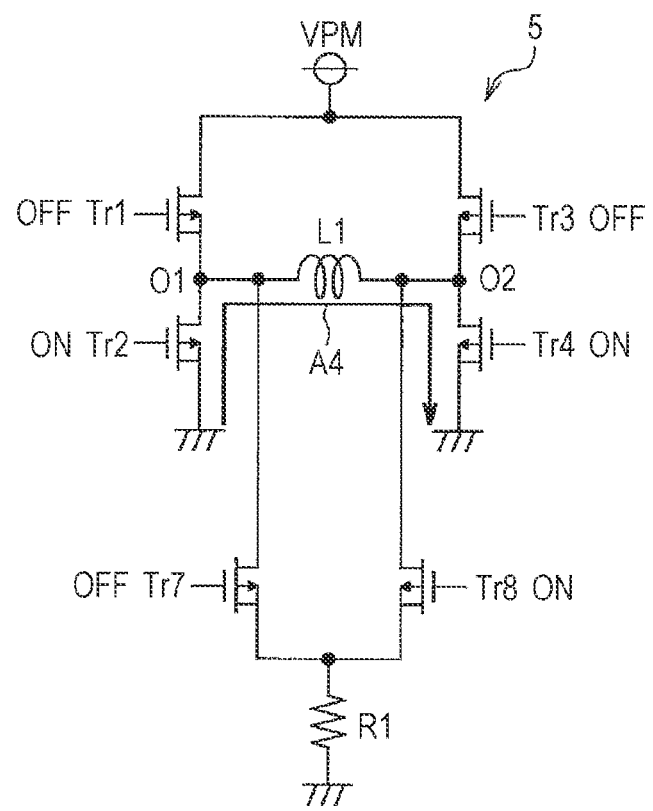
FIG. 6A

FIG. 10

DETECTION SIGNAL AND DETECTION RESULT OF ROTATION DETECTION

| DETECTION PULSE | | DETECTION RESULT | |
|---|---|---|---|
| | | ROTATION OK | ROTATION NG |
| IN-PHASE DETECTION | O1→O2 | LOW | HIGH |
| REVERSE PHASE DETECTION | O2→O1 | HIGH | LOW |

FIG. 12

RELATIONSHIP BETWEEN POLARITY BEFORE IMPACT
AND TERMINAL AT TIME OF DETECTION

| POLARITY | DETECTED TERMINAL | DETERMINED DIRECTION |
|---|---|---|
| 0 | O1 | FORWARD ROTATION SHIFT |
| 0 | O2 | REVERSE ROTATION SHIFT |
| 1 | O1 | REVERSE ROTATION SHIFT |
| 1 | O2 | FORWARD ROTATION SHIFT |

FIG. 14

POLARITY AT TIME OF POLARITY DETECTION AND DETECTION RESULT

| POLARITY | DETECTION PULSE | | MATCH WITH ACTUAL POLARITY | DO NOT MATCH WITH ACTUAL POLARITY |
|---|---|---|---|---|
| 0 | IN-PHASE DETECTION | O1→O2 | HIGH | LOW |
| | REVERSE PHASE DETECTION | O2→O1 | LOW | HIGH |
| 1 | IN-PHASE DETECTION | O2→O1 | HIGH | LOW |
| | REVERSE PHASE DETECTION | O1→O2 | LOW | HIGH |

FIG. 15

| | POLARITY BEFORE IMPACT | DETECTION PULSE | | DETECTION RESULT | |
|---|---|---|---|---|---|
| | | | | NO SHIFT (POLARITY IS SAME AS THAT BEFORE IMPACT) | SHIFTED (POLARITY IS DIFFERENT FROM THAT BEFORE IMPACT) |
| SINGLE | 0 | IN-PHASE | O1→O2 | HIGH | LOW |
| | | REVERSE PHASE | O2→O1 | LOW | HIGH |
| | 1 | IN-PHASE | O2→O1 | HIGH | LOW |
| | | REVERSE PHASE | O1→O2 | LOW | HIGH |

FIG. 27

RELATIONSHIP BETWEEN POLARITY BEFORE IMPACT AND TERMINAL AT TIME OF DETECTION

| POLARITY | DETERMINED DIRECTION | INITIAL DETECTION | SECOND DETECTION | THIRD DETECTION | FOURTH DETECTION | POINTER |
|---|---|---|---|---|---|---|
| 0 | FORWARD ROTATION SHIFT | 01 | 02 | 01 | — | REVERSE DIRECTION, 1 STEP |
| 0 | REVERSE ROTATION SHIFT | 02 | 01 | 02 | 01 | FORWARD DIRECTION, 1 STEP |
| 1 | REVERSE ROTATION SHIFT | 01 | 02 | 01 | 02 | NO CORRECTION |
| 1 | FORWARD ROTATION SHIFT | 02 | 01 | 02 | — | NO CORRECTION |

FIG. 36

DETECTION SIGNAL AND DETECTION RESULT OF ROTATION DETECTION

| POLARITY | DETECTION PULSE | | DETECTION RESULT | |
|---|---|---|---|---|
| | | | ROTATION OK | ROTATION NG |
| 0 | ROTATION DETECTION | O3→O1 | LOW | HIGH |
| | REVERSE PHASE DETECTION | O1→O3 | HIGH | LOW |
| 1 | ROTATION DETECTION | O3→O1 | LOW | HIGH |
| | REVERSE PHASE DETECTION | O1→O3 | HIGH | LOW |

AT TIME OF IMPACT DETECTION

FIG. 38

RELATIONSHIP BETWEEN POLARITY BEFORE IMPACT
AND TERMINAL AT TIME OF DETECTION

| POLARITY | DETECTED TERMINAL | DETERMINED DIRECTION |
|---|---|---|
| 0 | O1 | REVERSE ROTATION SHIFT |
| 0 | O2 | FORWARD ROTATION SHIFT |
| 1 | O1 | FORWARD ROTATION SHIFT |
| 1 | O2 | REVERSE ROTATION SHIFT |

FIG. 40

POLARITY AT TIME OF POLARITY DETECTION AND DETECTION RESULT

| POLARITY | DETECTION PULSE | | MATCH WITH ACTUAL POLARITY | DO NOT MATCH WITH ACTUAL POLARITY |
|---|---|---|---|---|
| 0 | IN-PHASE DETECTION | O3→O1 | HIGH | LOW |
| | REVERSE PHASE DETECTION | O1→O3 | LOW | HIGH |
| 1 | IN-PHASE DETECTION | O3→O1 | HIGH | LOW |
| | REVERSE PHASE DETECTION | O1→O3 | LOW | HIGH |

FIG. 41

| | POLARITY BEFORE IMPACT | DETECTION PULSE | | DETECTION RESULT | |
|---|---|---|---|---|---|
| | | | | NO SHIFT (POLARITY IS SAME AS THAT BEFORE IMPACT) | SHIFTED (POLARITY IS DIFFERENT FROM THAT BEFORE IMPACT) |
| DUAL | 0 | IN-PHASE | O3→O1 | HIGH | LOW |
| | | REVERSE PHASE | O1→O3 | LOW | HIGH |
| | 1 | IN-PHASE | O3→O1 | HIGH | LOW |
| | | REVERSE PHASE | O1→O3 | LOW | HIGH |

POINTER DEVICE, ELECTRONIC WATCH, CONTROL METHOD FOR POINTER DEVICE, AND RECORDING MEDIUM

REFERENCE OF RELATED APPLICATION

The present application claims priority based on Japanese Patent Application No. 2019-209405 filed on Nov. 20, 2019, and all the content of the basic application is incorporated in the present application.

This technical field relates to a pointer device, an electronic watch, a control method for the pointer device, and a recording medium.

BACKGROUND

JP 2005-172677 A

For example, JP 2005-172677 A discloses an analog electronic watch with which braking control is performed on a step motor at a timing at which an impact is detected.

SUMMARY

The present embodiment provides a pointer device including
a pointer;
a stepping motor including a coil and configured to drive the pointer;
a driving circuit configured to drive the stepping motor;
a detection unit configured to detect electromotive force generated in the coil due to an impact; and
at least one processor configured to control driving of the driving circuit, in which
the processor
determines a direction in which the pointer is likely to be shifted, based on the electromotive force detected by the detection unit,
determines whether the pointer is shifted in the direction due to the impact, and
upon determining that the pointer is shifted, corrects a position of the pointer in accordance with the direction.

BRIEF DESCRIPTION OF THE DRAWINGS

FIG. 5A is an explanatory diagram for illustrating detection of forward rotation of a rotor;

FIG. 6A is an explanatory diagram for illustrating detection of reverse rotation of the rotor;

FIG. 10 is an explanatory diagram illustrating the relationship between a detection signal of rotation detection and a detection result;

FIG. 12 is an explanatory diagram illustrating the relationship between the polarity before the impact and a terminal at the time of detection;

FIG. 14 is an explanatory diagram illustrating the relationship between the polarity and the detection result at the time of polarity detection;

FIG. 15 is an explanatory diagram illustrating whether the polarity before the impact and the current polarity are shifted from each other, based on the detection result in FIG. 14;

FIG. 27 is an explanatory diagram illustrating the relationship between the polarity before the impact and a terminal at the time of detection corresponding to the experimental data in FIGS. 22 to 26;

FIG. 36 is an explanatory diagram illustrating the relationship between the detection signal of the rotation detection and the detection result according to the third embodiment;

FIG. 38 is an explanatory diagram illustrating the relationship between the polarity before the impact and a terminal at the time of detection according to the third embodiment;

FIG. 40 is an explanatory diagram illustrating the relationship between the polarity and the detection result at the time of polarity detection according to the third embodiment;

FIG. 41 is an explanatory diagram illustrating whether the polarity before the impact and the current polarity are shifted from each other, based on the detection result in FIG. 40;

DETAILED DESCRIPTION

First Embodiment

Figure 1:
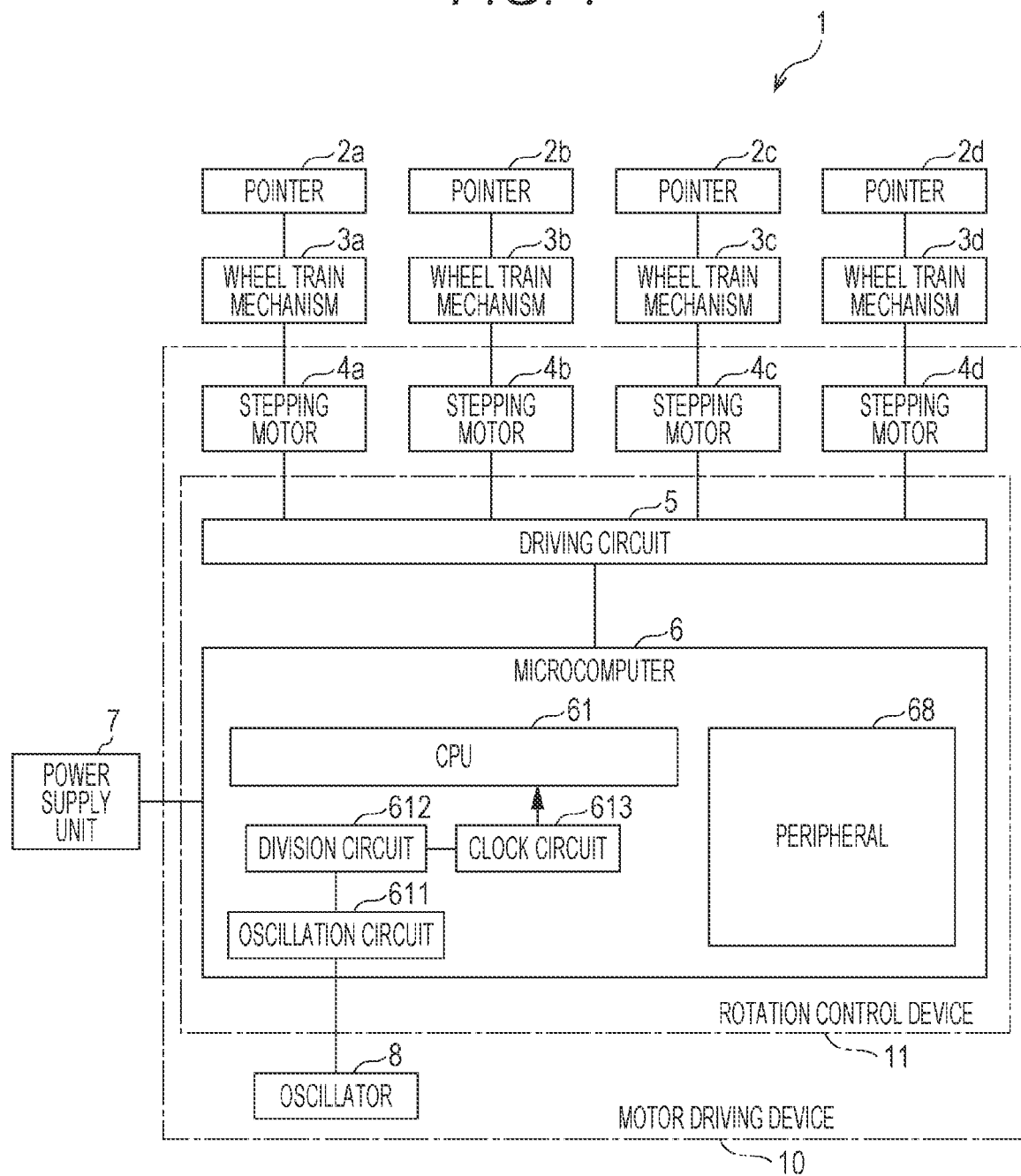
FIG. 1 is a schematic configuration diagram illustrating an electronic watch according to a first embodiment.

FIG. 1 is a schematic configuration diagram illustrating an electronic watch 1 according to a first embodiment. The analog electronic watch 1 according to the present embodiment has four pointers 2a to 2d (display units) that can each be driven by an independent motor, and is a watch type electronic watch including a band to be worn on a wrist, for example, but is not particularly limited.

This electronic watch 1 has, for example, the pointers 2a to 2d and stepping motors 4a to 4d (motors) that rotationally drive the pointers 2a to 2d via wheel train mechanisms 3a to 3d (display unit), respectively. The electronic watch 1 further includes a driving circuit 5 that drives the stepping motors 4a to 4d, a microcomputer 6, a power supply unit 7, and an oscillator 8.

Hereinafter, the pointers 2a to 2d are simply referred to as a pointer 2 when they are not distinguished from each other. The wheel train mechanisms 3a to 3d are simply referred to as a wheel train mechanism 3 when they are not distinguished from each other. Similarly, the stepping motors 4a to 4d are simply referred to as a stepping motor 4 when they are not distinguished from each other.

The section including the stepping motor 4, the driving circuit 5, the microcomputer 6, and the oscillator 8 may be referred to as a "motor drive device". Since the microcomputer 6 and the driving circuit 5 have a function of controlling the rotation of the stepping motor 4, the part including the driving circuit 5 and the microcomputer 6 may be referred to as a "rotation control device".

The driving circuit 5 has a bridge circuit that drives the stepping motor 4, and applies a voltage to the stepping motor 4 in response to a command from the microcomputer 6. The microcomputer 6 is a large-scale integration (LSI), and includes a central processing unit (CPU) 61 (control unit), a peripheral 68, an oscillation circuit 611, a division circuit 612, and a watch circuit 613 (time measurement unit).

Each of the pointers 2a to 2d is rotatably provided to a rotary shaft on a dial. The wheel train mechanisms 3a to 3d respectively rotate the pointers 2a to 2d. The driving circuit 5 outputs a drive voltage signal for driving the stepping motors 4a to 4d at an appropriate timing based on a control signal input from the microcomputer 6. The driving circuit 5 can adjust the drive voltage and the drive voltage pulse width of the stepping motor 4 based on a setting signal from the microcomputer 6, and output the signals. The driving circuit 5 can output a drive signal in the forward rotation direction or the reverse rotation direction, to the stepping motor 4.

The CPU 61 performs various types of calculation processing and comprehensively controls the overall operation of the electronic watch 1. The CPU 61 reads out and executes a control program, to cause each unit to continuously perform an operation related to time display. Furthermore, the CPU 61 makes a requested operation be performed in real time or at a set timing, based on an input operation performed on an operation unit (not illustrated). The CPU 61 is a control unit that sets a target position to which the pointer 2 moves and controls driving of the driving circuit 5.

Furthermore, the CPU 61 corrects the position of the pointer 2 based on the electromotive force detected by an A/D converter 702 (detection unit) described later. In particular, the CPU 61 detects an impact by detecting the electromotive force, and corrects the position of the pointer 2 based on the pattern of the electromotive force detected by the A/D converter 702 when the impact is detected.

The oscillation circuit 611 generates a unique frequency signal and outputs the signal to the division circuit 612. As the oscillation circuit 611, for example, a circuit that oscillates in combination with the oscillator 8 such as a crystal is used. The division circuit 612 divides the signal input from the oscillation circuit 611 into signals of various frequencies used by the CPU 61 and the watch circuit 613, and outputs the signals. The watch circuit 613 is a counter circuit that calculates the current time by counting the number of times a predetermined frequency signal is input from the division circuit 612, and adding the result to the initial time. The current time calculated by the watch circuit 613 is read by the CPU 61 and used for time display. This time calculation may be software controlled. The power supply unit 7 is configured to enable the electronic watch 1 to continuously and stably operate, and is a combination of a battery and a DC-DC converter, for example. As a result, the output voltage of the power supply unit 7 during operation is maintained to be a stable value.

Figure 2:
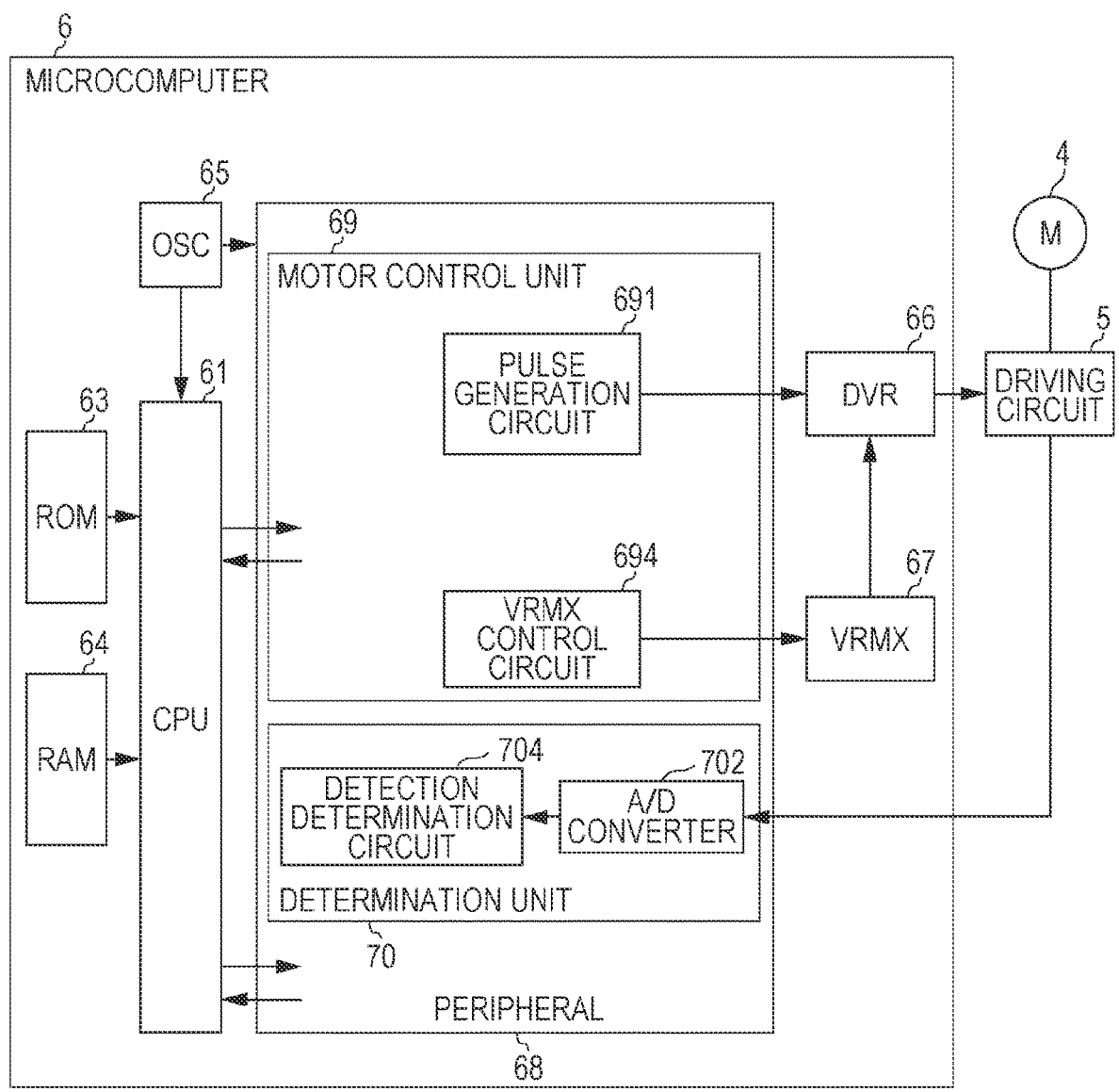
FIG. 2 is a schematic block diagram of a microcomputer.

FIG. 2 is a schematic block diagram of the microcomputer 6 that is an LSI. The microcomputer 6 includes a CPU 61, a read only memory (ROM) 63, a random access memory (RAM) 64, an oscillator (OSC) 65, a peripheral 68, a VRMX 67, and a DVR 66. Various control programs and initial setting data are held in the ROM 63. The CPU 61 reads the various control programs (not illustrated) when the electronic watch 1 is started, and then continuously executes the programs.

The RAM 64 is a volatile memory such as a static random access memory (SRAM) or a dynamic random access memory (DRAM) and provides the CPU 61 with a working memory space. Furthermore, the RAM 64 can temporarily store user setting data set based on an input operation on the operation unit and the like. A part of the RAM 64 may be a nonvolatile memory such as a flash memory or an electrically erasable and programmable read only memory (EEPROM). The OSC 65 generates a unique frequency signal and supplies the signal to the CPU 61, the peripheral 68, and the like. The OSC 65 is a combination of the oscillation circuit 611 and the oscillator 8 in FIG. 1.

The DVR 66 is a circuit that drives a signal that drives a motor. The VRMX 67 is a regulator that generates power to be supplied to this DVR 66. The peripheral 68 includes a motor control unit 69 and a determination unit 70. The motor control unit 69 has a pulse generation circuit 691 and a VRMX control circuit 694.

Further, the determination unit 70 includes an A/D converter 702 and a detection determination circuit 704. These components, that is, the pulse generation circuit 691, the VRMX control circuit 694, the A/D converter 702, and the detection determination circuit 704 may be a motor control unit in a single microcomputer, or these components may each be provided with a separate motor control unit, and each operation may be performed by a single microcomputer or by a plurality of microcomputers.

The pulse generation circuit 691 outputs (applies) various pulses such as a drive pulse for driving the stepping motor 4. The VRMX control circuit 694 controls the VRMX 67 to generate a power supply voltage. The A/D converter 702 converts an analog voltage (details will be described later) in the driving circuit 5 into a digital signal. The detection determination circuit 704 determines whether the stepping motor 4 has rotated based on the digital signal.

Figure 3:
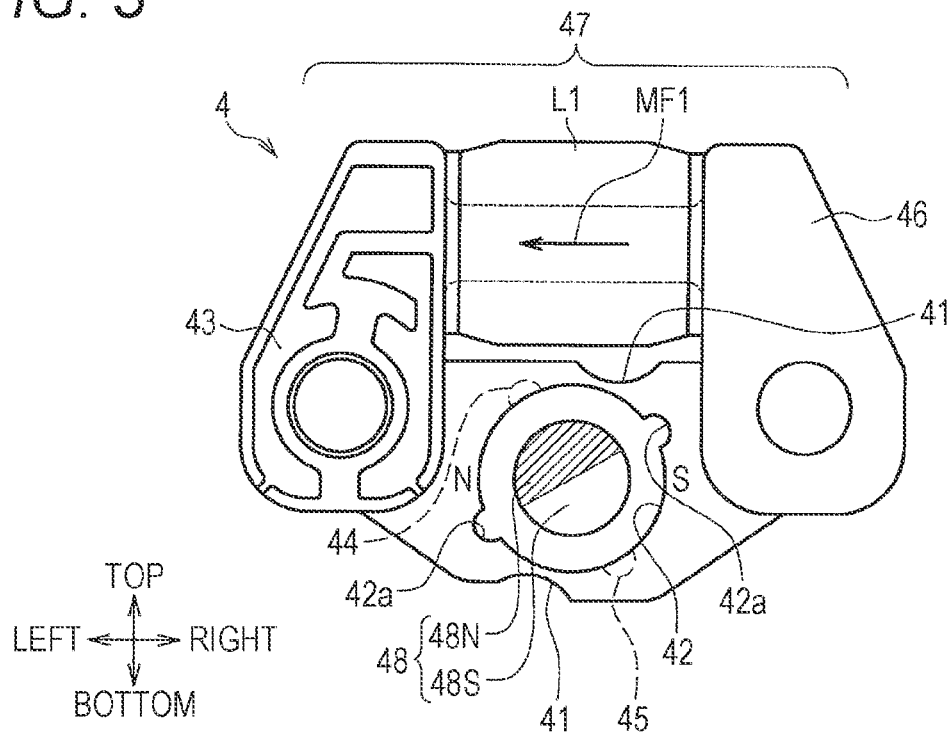
FIG. 3 is a plan view of a stepping motor having a single core structure.

FIG. 3 is a plan view of the stepping motor 4 having a single core structure. The stepping motor 4 has a stator 47 and a rotor 48. The rotor 48 is formed to have a disk shape, is supported to be rotatable in the circumferential direction, and has a magnet magnetized in two poles in the radial direction. In the rotor 48, a white part represents an S pole 48S, and a hatched part represents an N pole 48N. For the rotor 48, a magnet such as a rare earth magnet or the like (such as, for example, a samarium cobalt magnet) is preferably used, for example, but the rotor 48 is not limited to this.

The rotor 48 is arranged to be rotatable about a shaft (not illustrated) provided on the stator 47. In the present embodiment, the rotor 48 can be rotated at a predetermined step angle in either the counterclockwise direction or the clockwise direction, when a drive pulse is applied to a coil L1 described later. When the stepping motor 4 is applied to a watch or the like, the rotor 48 is connected with, for example, a gear that is a part of the wheel train mechanism 3 for moving the pointer 2 of the watch. This gear or the like can be rotated by rotating the rotor 48.

The stator 47 has an iron core 46 formed in a substantially rectangular frame shape, and the coil L1 provided to an upper side portion thereof. A substantially circular hole 42 is formed in the center of the lower side of the iron core 46, and the rotor 48 is arranged so as to be concentric with the hole 42. When a current flows in the coil L1, the stator 47 has magnetic poles appearing near regions 44 and 45. The polarities of the magnetic poles around the regions 44 and 45 are determined by the direction of the current flowing in the coil L1. The coil L1 is connected to the driving circuit 5 (see FIG. 1) via a terminal block 43.

Therefore, when the coil L1 is driven to make magnetic poles repelling the N pole 48N and the S pole 48S appear in the regions 44 and 45, the rotor 48 rotates. Further, the stator 47 has two recesses 42a formed on the inner circumference surface of the hole 42 that receives the rotor 48. The two recesses 42a are formed in directions of about 60 degrees and about 240 degrees, where the upward direction of the drawing is defined as 0 degrees. With the two recesses 42a, the stationary state of the rotor 48 can be maintained.

In the present embodiment, the stepping motor 4 has the largest index torque (holding torque) when the N pole 48N and the S pole 48S face the regions 44 and 45. Therefore, in a non-energized state in which no current flows in the coil L1, the rotor 48 magnetically and stably stops at a stop position illustrated in FIG. 3 or at a stop position as a result of rotation by 180 degrees from this stop position. In the present embodiment, these stop positions are called "stable positions". Furthermore, the iron core 46 has substantially arcuate recesses 41 formed in an upper right portion and a lower left portion of the rotor 48. The positions where the recesses 41 are formed are positions where the cross-sectional area of the iron core 46 becomes the smallest (or a minimum value appears in the cross-sectional area), and magnetic saturation is likely to occur. In FIG. 3, the rotor 48 is stopped with the N pole at the upper left and the S pole at the lower right.

Figure 4:
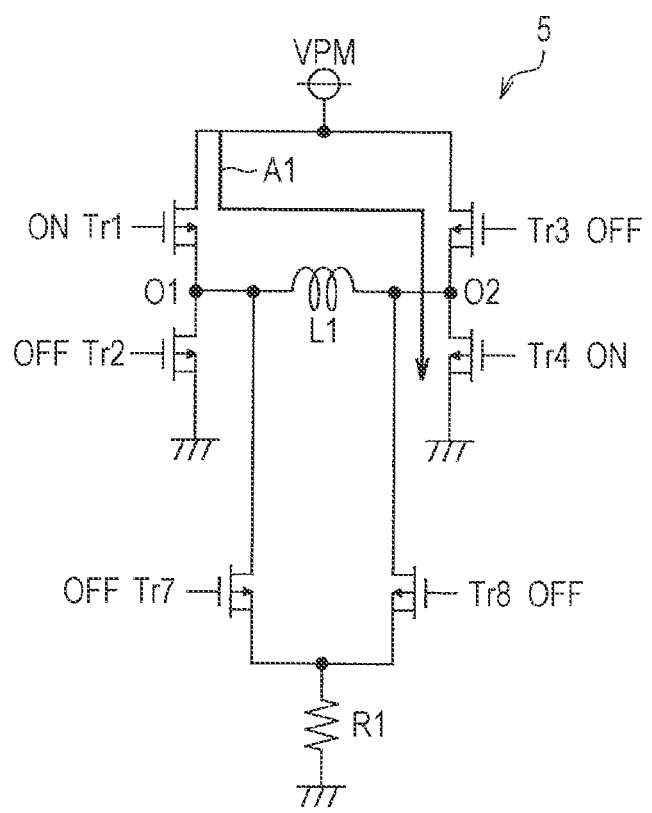
FIG. 4 is a circuit diagram of a driving circuit.

FIG. 4 is a circuit diagram of the driving circuit 5. The driving circuit 5 applies the pulse generated by the pulse generation circuit 691 to the coil L1 of the stepping motor 4. The driving circuit 5 has an H-bridge circuit composed of switch elements Tr1 to Tr4, and the switch elements Tr1 to Tr4 are, for example, metal-oxide-semiconductor field-effect transistors (MOSFETs). Switch elements Tr7 and Tr8 and a resistor R1 form a discharge circuit that discharges the energy stored in the coil L1. In the present embodiment, the terminal voltage of the coil L1 is referred to as a coil voltage V1 and the current flowing in the coil L1 is referred to as a coil current I1.

The power supply unit 7 applies a power supply voltage Vcc between a power supply terminal and a ground terminal of the driving circuit 5 (see FIG. 1). The switch elements Tr1 and Tr2 are connected in series via a connection point O1 and the switch elements Tr3 and Tr4 are connected in series via a connection point O2, between a voltage terminal and the ground terminal. The resistor R1 has one end connected to the ground terminal, the switch element Tr7 is connected between the connection point O1 and the other end of the resistor R1, and the switch element Tr8 is connected between the connection point O2 and the other end of the resistor R1. Furthermore, the other end of the resistor R1 is connected to an input terminal of the A/D converter 702. The coil L1 is connected between the connection points O1 and O2.

When the power supply voltage Vcc is applied to the power supply terminal of the driving circuit 5 to turn OFF the switch elements Tr2 and Tr3 and turn ON the switch elements Tr1 and Tr4, the power supply voltage Vcc is applied to the connection point O1 and a current flows along a path A1. In this case, a magnetic flux MF1 is generated in the coil L1 in a direction indicated by the arrow (see FIG. 3). In this case, the rotor 48 rotates clockwise in the drawing (see FIG. 3).

This clockwise rotation is defined as forward rotation, and the counterclockwise rotation is defined as reverse rotation. Moreover, the position of the rotor 48 in FIG. 3 is defined as polarity 0. Note that these directions and polarity of the magnetic flux are examples, and the present invention is not limited to these.

<Impact Detection>

Next, the impact detection according to the present embodiment will be described with reference to FIGS. 5 to 7. In the present embodiment, when the stepping motor 4 receives an impact, the rotor 48 rotates. The magnetic flux is generated in the coil L1 due to the rotation of the rotor 48. When the magnetic flux is generated, electromotive force is generated in the coil L1, so that the electromotive force is amplified, resulting in the A/D converter 702 (see FIG. 2) of the determination unit 70 detecting the impact. In this case, the CPU 61 controls the driving circuit 5 as follows.

Figure 5B:
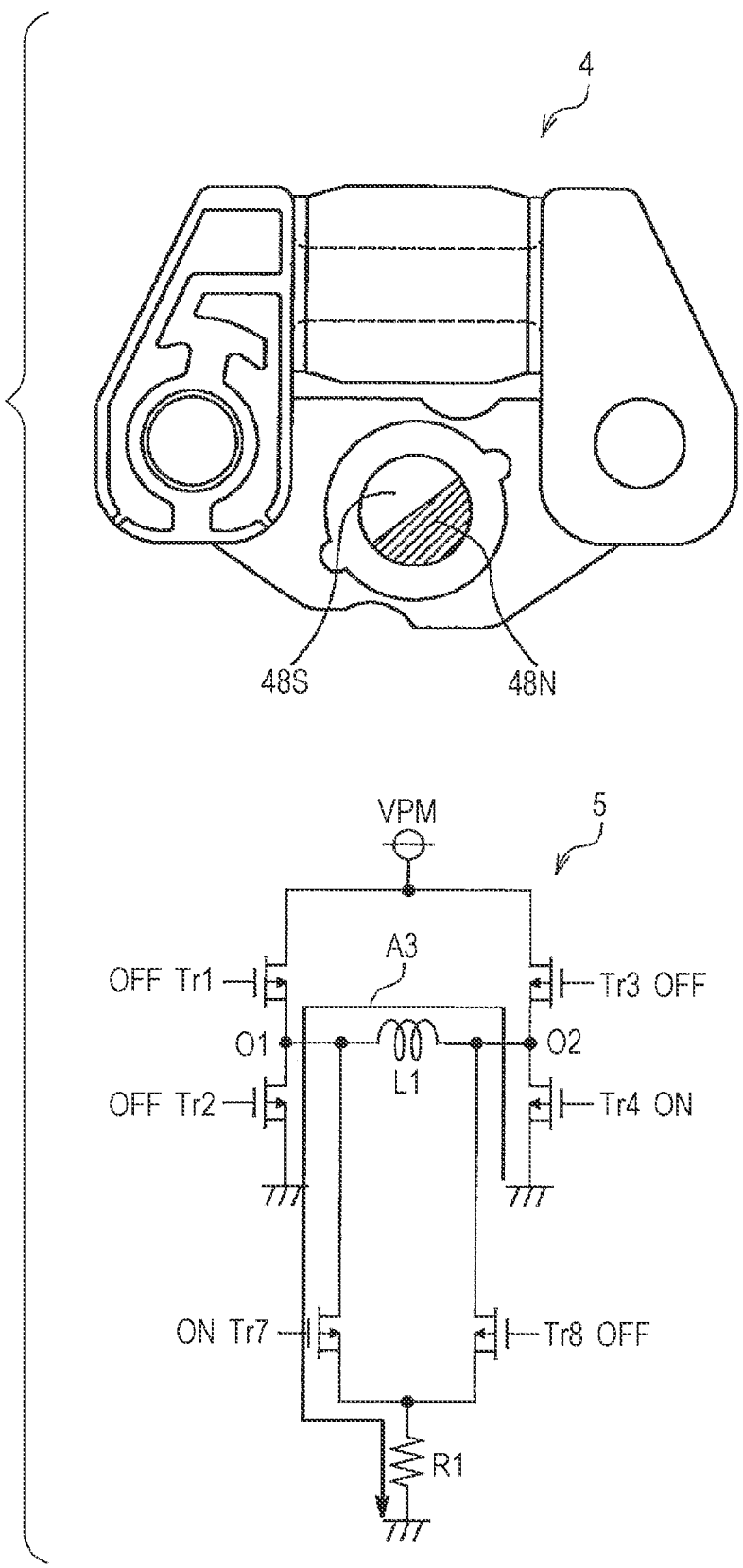
FIG. 5B is an explanatory diagram for illustrating detection of forward rotation of the rotor.

FIGS. 5A and 5B illustrate the case of detecting the forward rotation. In FIG. 5A, the CPU 61 has turned ON the switch elements Tr2, Tr4, and Tr7 and has turned OFF the switch elements Tr1, Tr3, and Tr8. The stepping motor 4 on the upper side in FIG. 5A indicates the position and rotation direction of the rotor 48 as well as the direction of the magnetic flux MF2 generated in the coil L1. The N pole of the rotor 48 is substantially on the right side. When the rotor 48 rotates in the forward direction, a rightward magnetic flux MF2 is generated in the coil L1, electromotive force is generated in the direction from the connection point O2 to the connection point O1, and a current flows along a path A2. The path A2 is a path starting from the ground, passing through the switch element Tr4, the coil L1, and the switch element Tr2, and returning to the ground.

Next, as illustrated in FIG. 5B, the CPU 61 turns OFF the switch element Tr2. Then, the electromotive force generated in the coil L1 flows as a current along a path A3. The path A3 is a path starting from the switch element Tr4 and flowing through the coil L1 to pass through the switch element Tr7 and the resistor RE The voltage across the resistor R1 is proportional to the current flowing through the coil L1. In the stepping motor 4 on the upper side in FIG. 5B, the N pole of the rotor 48 is on the lower right side.

Figure 6B:
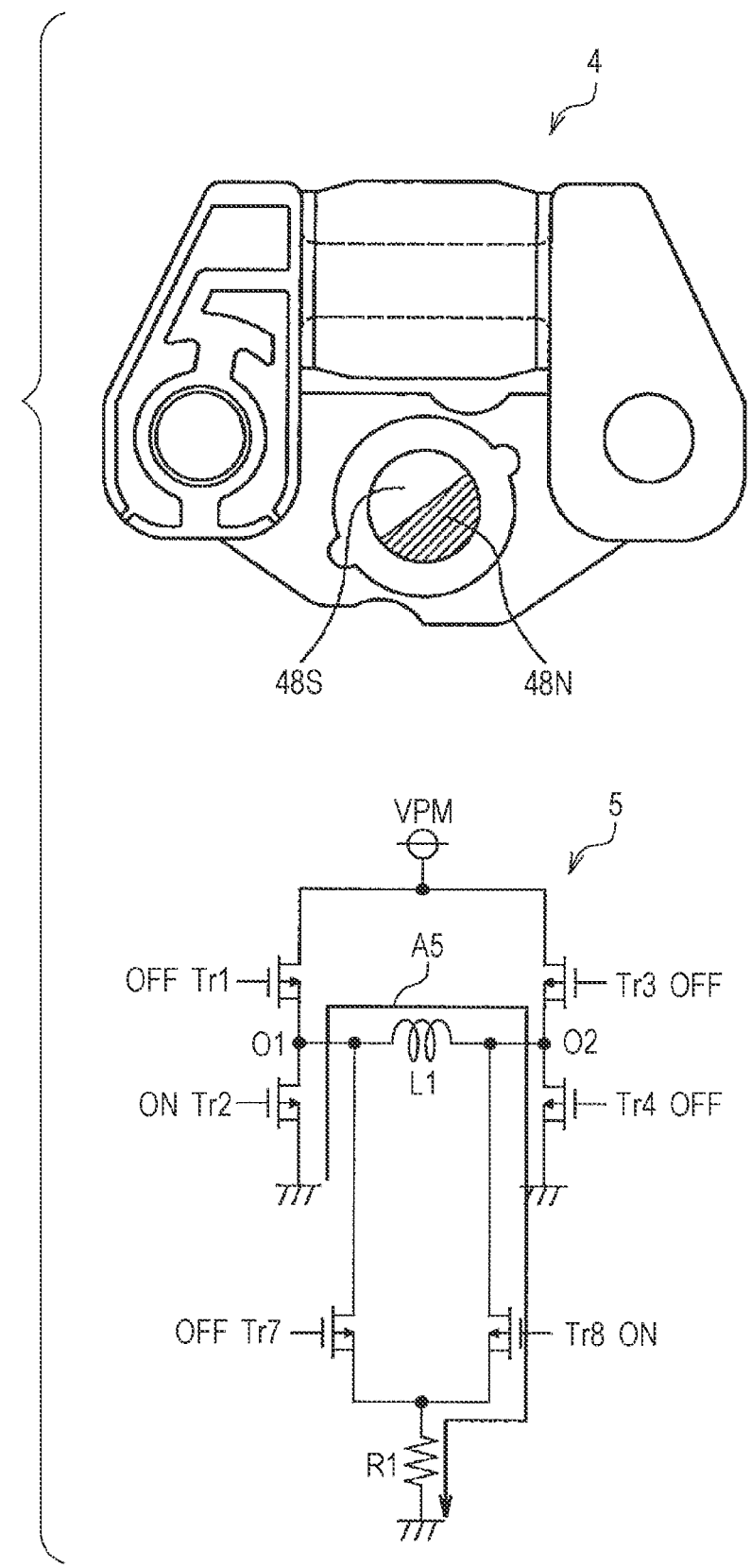
FIG. 6B is an explanatory diagram for illustrating detection of reverse rotation of the rotor.

FIGS. 6A and 6B illustrate a case of detecting the reverse rotation. In FIG. 6A, the CPU 61 has turned ON the switch elements Tr2, Tr4, and Tr8 and has turned OFF the switch elements Tr1, Tr3, and Tr7. The stepping motor 4 on the upper side in FIG. 6A indicates the position and rotation direction of the rotor 48 as well as the direction of the magnetic flux MF1 generated in the coil L1. The N pole of the rotor 48 is substantially on the left side. When the rotor 48 rotates in the reverse direction, a rightward magnetic flux MF1 is generated in the coil L1, electromotive force is generated in the direction from the connection point O1 to the connection point O2, and a current flows along a path A4. The path A4 is a path starting from the ground, passing through the switch element Tr2, the coil L1, and the switch element Tr4, and returning to the ground.

Next, as illustrated in FIG. 6B, the CPU 61 turns OFF the switch element Tr4. Then, the electromotive force generated in the coil L1 flows as a current along a path A5. The path A5 is a path starting from the ground and flowing through the switch element Tr2, the coil L1, the switch element Tr8, and the resistor RE The voltage across the resistor R1 is proportional to the current flowing through the coil L1.

In the stepping motor 4 on the upper side in FIG. 6B, the N pole of the rotor 48 is on the lower right side.

In the present embodiment, the CPU 61 repeats the operations in FIGS. 5A to 6B. When an impact occurs on the stepping motor 4, the A/D converter 702 of the determination unit 70 detects a pulse in the voltage across the resistor R1 at the timing illustrated in FIG. 5B or 6B. Thus, the electromotive force generated in the coil L1 can be detected.

Figure 7:
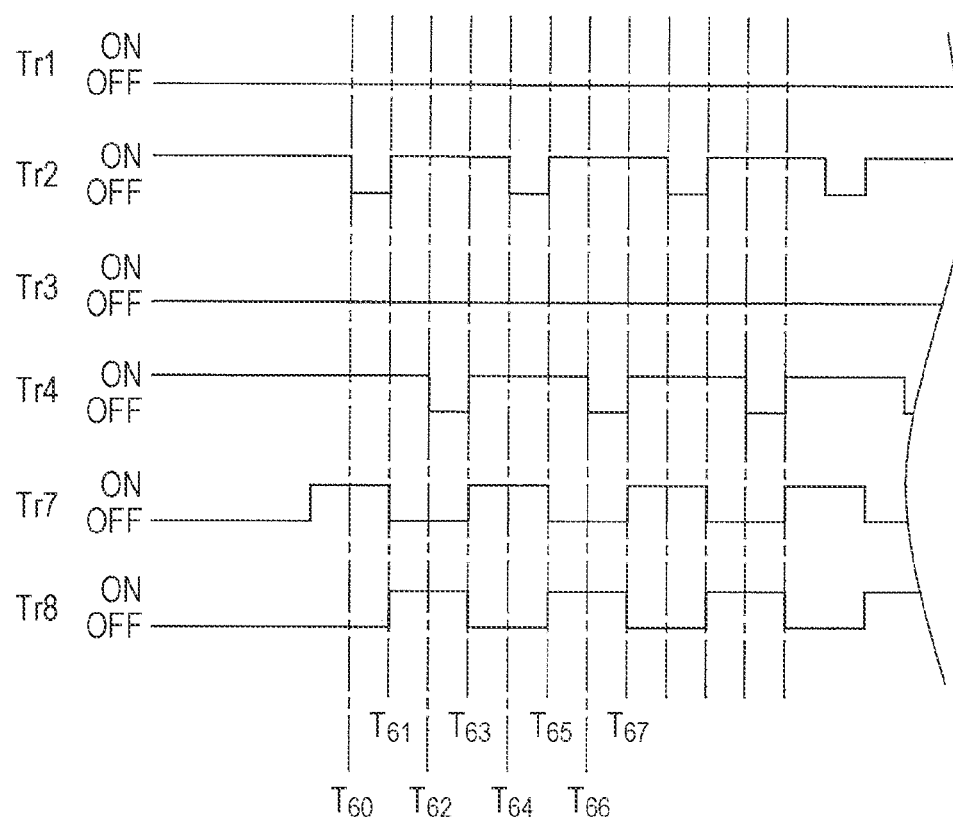
FIG. 7 is a timing chart illustrating operations of switch elements in FIGS. 5A, 5B, 6A, and 6B.

FIG. 7 is a timing chart illustrating operations of the switch elements Tr1 to Tr4 and the switch elements Tr7 and Tr8 in FIGS. 5A, 5B, 6A, and 6B.

As illustrated in FIG. 7, the switch elements Tr1 and Tr3 are normally OFF.

Immediately before a time point T60, the switch elements Tr2, Tr4, and Tr7 are ON and the switch element Tr8 is OFF. This corresponds to the state of the switches illustrated in FIG. 5A.

At the time point T60, the switch element Tr2 is turned OFF. This corresponds to the state of the switches illustrated in FIG. 5B.

At a time point T61, the switch elements Tr2 and Tr8 are turned ON and the switch element Tr7 is turned OFF. Thus, the switch elements Tr2, Tr4, and Tr8 are ON, and the switch element Tr7 is OFF. This corresponds to the state of the switches illustrated in FIG. 6A.

At a time point T62, the switch element Tr4 is turned OFF. This corresponds to the state of the switches illustrated in FIG. 6B.

At a time point T63, the switch elements Tr4 and Tr7 are turned ON and the switch element Tr8 is turned OFF.

At time points T64 to T67 thereafter, the switches are in the same states as those at the time points T60 to T63. Thus, the states are repeatedly achieved.

In the impact detection, as illustrated in FIG. 7, the CPU 61 repeatedly achieves the states illustrated in FIGS. 5A and 5B and FIGS. 6A and 6B to detect a current generated due to an impact.

<Timing of Fall Detection>

Figure 8:
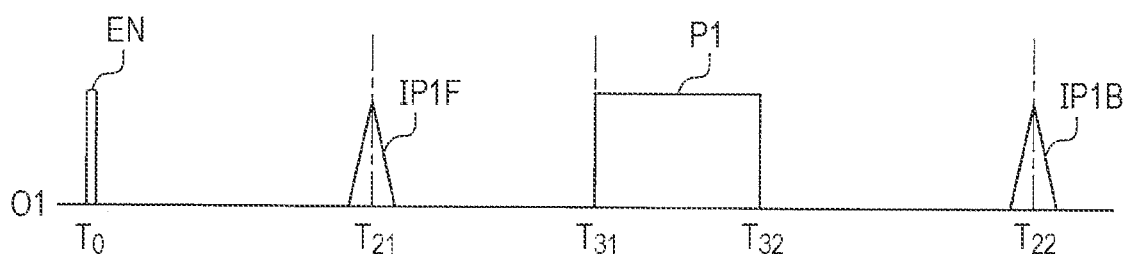
FIG. 8 is a timing chart illustrating timings in fall detection for the stepping motor.

The CPU 61 starts impact detection in response to pulse enable EN. FIG. 8 is a timing chart illustrating timings in fall detection for the stepping motor 4.

As illustrated in FIG. 8, the CPU 61 starts impact detection in response to the pulse enable EN at a time point T0. The pulse generation circuit 691 applies a drive pulse P1 to the coil L1 from a time point T31 to a time point T32. This drive pulse P1 drivingly rotates the rotor 48.

A time point T21 is between the time point T0 and the time point T31, and is before the pulse generation circuit 691 applies the drive pulse P1 to the connection point O1.

At the time point T21, when the CPU 61 detects an impact IP1F, the CPU 61 cancels the output of the drive pulse P1 and does not change the polarity of the rotor 48 determined by the CPU 61. On the other hand, when the CPU 61 detects an impact IP1B at a time point T22 after the application of the drive pulse P1, the CPU 61 changes the polarity of the rotor 48 determined by the CPU 61.

For example, the CPU 61 cancels the application of the drive pulse P1 when the pulse enable EN is provided with the polarity of the rotor 48 being 0, and when the impact IP1F is detected before the application of the drive pulse P1. Then, the CPU 61 maintains the polarity 0 of the rotor 48 and sets a fall flag (also referred to as an impact detection flag). On the other hand, when the impact IP1B is detected after the application of the drive pulse P1, the CPU 61 changes the polarity of the rotor 48 to 1 and sets the fall flag.

When the CPU 61 cancels the application of the drive pulse P1, the polarity is different from what it actually should be, and therefore the pointer position is shifted by a second even if the polarity is not shifted due to a fall (impact).

Overall Operation in First Embodiment

Figure 9:
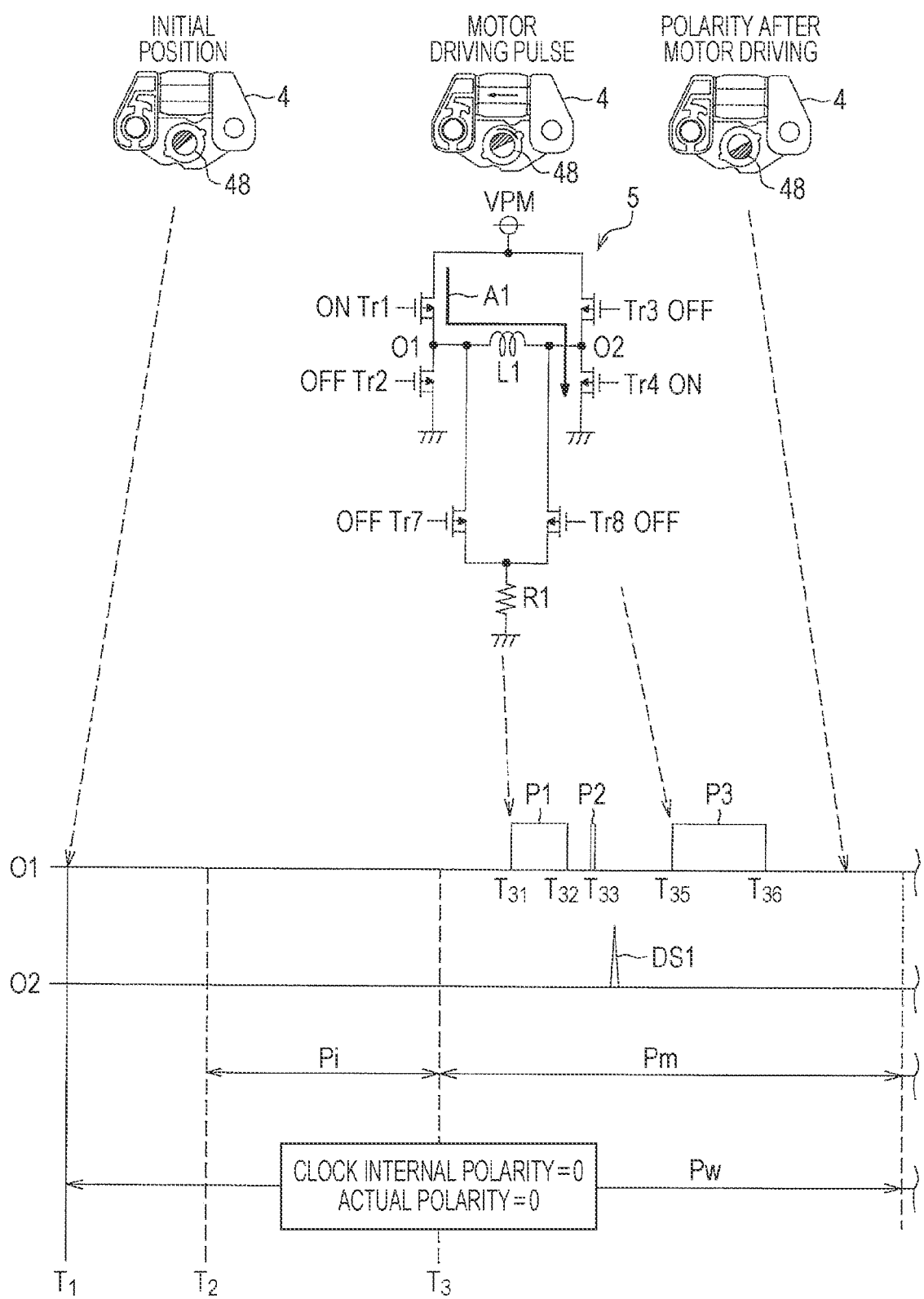
FIG. 9 is a timing chart illustrating a state in which a correction pulse is input to a coil.

Next, the overall operation of the present embodiment will be described with reference to FIGS. 9 to 20. FIG. 9 is a timing chart illustrating a state in which a correction pulse P3 is input to the coil L1.

As illustrated in FIG. 9, at a time point T1, the CPU 61 enables the drive pulse and impact detection, and starts a section Pw in which the watch internal polarity is 0 and the actual polarity is also 0. The watch internal polarity is data representing the polarity of the rotor 48 used in internal processing by the CPU 61, and the actual polarity is the real polarity determined by the position of the rotor 48. Furthermore, for convenience sake, the state of the actual polarity is also expressed by 0 or 1. The CPU 61 starts an impact detection operation at a time point T2.

An impact detection section Pi from the time point T2 to a time point T3 indicates a period during which an impact can be detected. The time point T3 indicates the timing of starting the operation of the stepping motor 4, and is the time point at which a motor drive section Pm starts. The pulse generation circuit 691 and the driving circuit 5 apply the drive pulse P1 to the connection point O1 from the time point T31 to the time point T32, and apply a detection pulse P2 to the connection point O1 at a time point T33 thereafter.

The detection pulse P2 is a pulse for detecting the polarity of the rotor 48. The pulse width of the detection pulse P2 is sufficiently shorter than that of the drive pulse P1. Thus, even if the detection pulse P2 is output, the rotor 48 does not rotate. After the detection pulse P2 has been output, the CPU 61 controls the driving circuit 5 with a pattern illustrated in FIG. 7, and the A/D converter 702 detects the current flowing through the resistor RE Then, the CPU 61 detects the polarity of the rotor 48 by determining whether the current flowing through the resistor R1 is higher (HIGH) or lower (LOW) than a certain threshold.

In FIG. 9, the detection result of a detection signal DS1, which is a current pulse flowing from the connection point O2 to the ground, is HIGH. In this case, the CPU 61 determines that the rotation of the rotor 48 by the drive pulse P1 has failed, and causes the pulse generation circuit 691 to apply the correction pulse P3 to the connection point O1 from a time point T35 to a time point T36.

FIG. 10 is an explanatory diagram illustrating the relationship between the detection signal of the rotation detection and the detection result. In FIG. 10, in-phase detection is illustrated as a case where the detection pulse P2 is applied from the connection point O1 to the connection point O2. Reverse phase detection is illustrated as the detection result obtained when the detection pulse P2 is applied from the connection point O2 to the connection point O1. The in-phase detection is detection of the polarity of the rotor 48 as a result of outputting the detection pulse P2 in the same direction as the last drive pulse P1 output. The reverse phase detection is detection of the polarity of the rotor 48 as a result of outputting the detection pulse P2 in the direction opposite to the last drive pulse P1 output. For example, in the case of the in-phase detection, the detection of a LOW current pulse flowing from the connection point O2 to the ground after the application of the drive pulse P1 to the connection point O1 indicates that the rotor 48 has rotated (rotation OK). On the other hand, the detection of a HIGH current pulse flowing from the connection point O2 to the ground indicates that the rotor 48 has not rotated (rotation NG).

Furthermore, in the case of the reverse phase detection, the detection of a HIGH current pulse flowing from the connection point O1 to the ground after the application of the drive pulse P1 to the connection point O1 indicates that the rotor 48 has rotated (rotation OK). On the other hand, the detection of a LOW current pulse flowing from the connection point O1 to the ground indicates that the rotor 48 has not rotated (rotation NG).

The CPU 61 updates the watch internal polarity when rotation OK is obtained as the determination result by the detection pulse P2. The timing of updating the watch internal polarity may be set to be any time point between the application of the detection pulse P2 and the next rotation of the rotor 48. In the present embodiment, the watch internal polarity is updated immediately after rotation OK is obtained as the determination result with the application of the detection pulse P2.

In FIG. 9, when the detection pulse P2 is applied from the connection point O1 to the connection point O2, HIGH is output from the connection point O2, indicating that the rotor 48 has not rotated (rotation NG). Therefore, the correction pulse P3 is applied to the connection point O1. The correction pulse P3 is a pulse for rotating the rotor 48. The pulse width of the correction pulse P3 may be changed as long as the rotor 48 can be rotated. Furthermore, the correction pulse P3 is a pulse applied when the rotor 48 is not rotated by the drive pulse P1. Thus, the pulse width of the correction pulse P3 is set to be wider than the pulse width of the drive pulse P1.

After the application of the correction pulse P3 by the pulse generation circuit 691, the CPU 61 updates the watch internal polarity. The timing of updating the watch internal polarity may be set to be any time point between the application of the correction pulse P3 and the next rotation of the rotor 48. In the present embodiment, the CPU 61 updates the watch internal polarity immediately after the application of the correction pulse P3.

Figure 11:
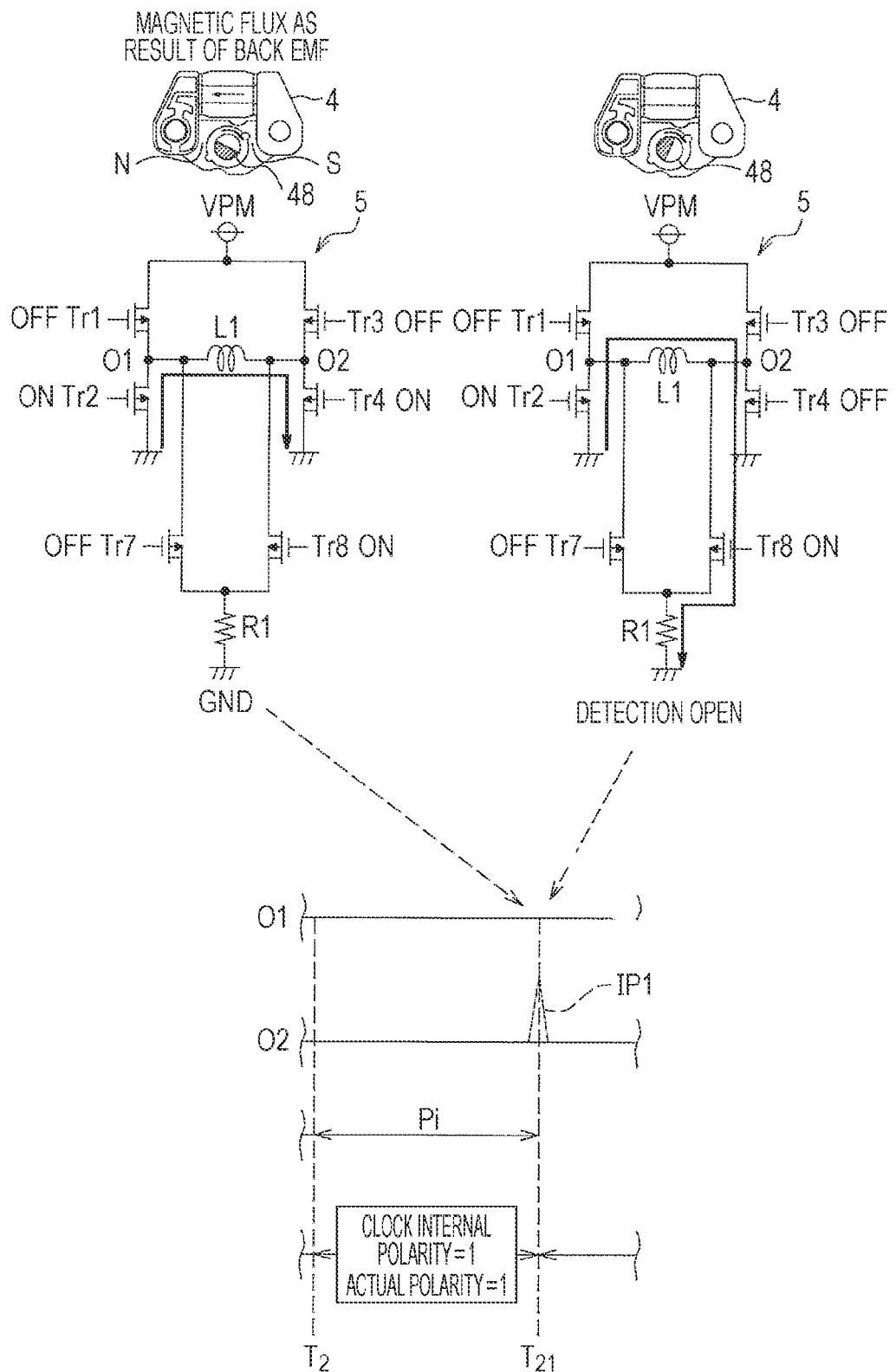
FIG. 11 is a timing chart in a case where a CPU detects an impact on the stepping motor with an A/D converter in an impact detection section at and after a time point T2.

Next, the impact detection will be described with reference to the timing chart of FIG. 11. FIG. 11 is a timing chart in a case where the CPU 61 detects an impact on the stepping motor 4 with the A/D converter 702 in the impact detection section Pi at and after the time point T2.

In FIG. 11, the watch internal polarity is 1, and the actual polarity is 1. The CPU 61 controls the driving circuit 5 with the pattern illustrated in FIG. 7, detects the current flowing through the resistor R1 with the A/D converter 702, and detects the current pulse flowing from any one of the connection points O1 and O2 to the ground. Here, at a time point T21, the CPU 61 detects the impact with the current pulse flowing from the connection point O2 to the ground.

The driving circuit 5 illustrated on the upper left side in FIG. 11 indicates that a current is flowing due to the electromotive force generated in the coil L1. The driving circuit 5 illustrated on the upper right side indicates that the electromotive force generated in the coil L1 is detected as a current pulse (current IP1).

Furthermore, the CPU 61 stops software processing (operation), upon detecting an impact with the current pulse (current IP1). In this case, the CPU 61 stops the software processing (operation) at and after the time point T21. As a result, the watch internal polarity is fixed regardless of the orientation of the rotor 48, at and after the time point T21 until the software processing is resumed.

Here, the CPU 61 can correct the position of the pointer 2 based on the peak of the electromotive force detected by the A/D converter 702. In the first embodiment, a case where the CPU 61 corrects the position of the pointer 2 based on a first peak of the electromotive force detected by the A/D converter 702 will be described.

FIG. 12 is an explanatory diagram illustrating the relationship between the polarity before the impact and a terminal at the time of detection. As illustrated in FIG. 12, when the polarity before the impact is 0 and the current IP1 flowing from the connection point O1 to the ground is detected, it is determined that there is a possibility of forward rotation shift. On the other hand, when the polarity before the impact is 0 and the current IP1 flowing from the connection point O2 to the ground is detected, it is determined that there is a possibility of reverse rotation shift. When the polarity before the impact is 1 and the current IP1 flowing from the connection point O1 to the ground is detected, it is determined that there is a possibility of reverse rotation shift. On the other hand, when the polarity before the impact is 1 and the current IP1 flowing from the connection point O2 to the ground is detected, it is determined that there is a possibility of forward rotation shift. That is, the CPU 61 can determine the direction in which the pointer 2 is likely to shift based on the first peak of the electromotive force.

Figure 13:
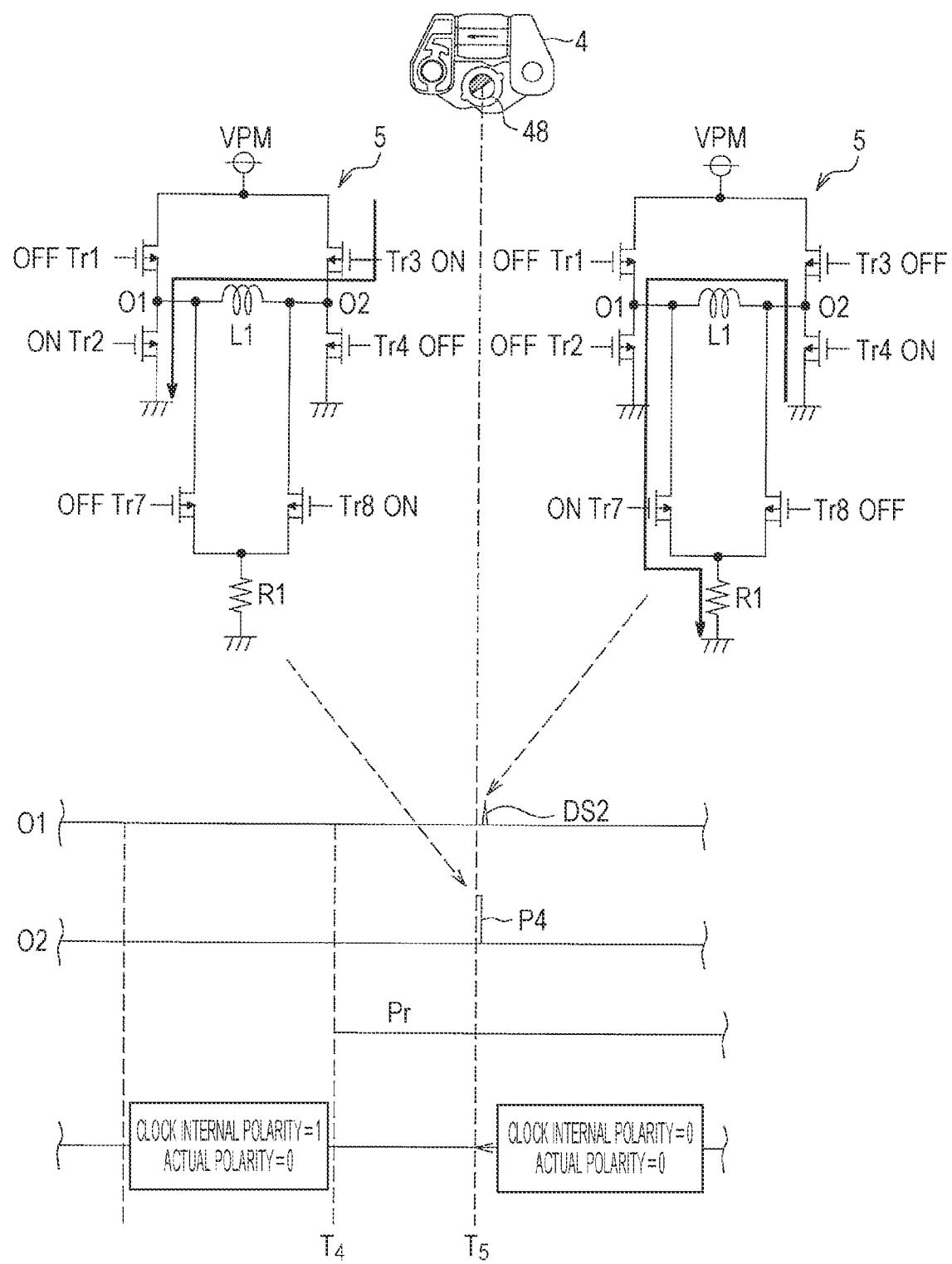
FIG. 13 is a timing chart illustrating a case where the CPU executes polarity detection for the driving circuit.

Next, the polarity detection will be described with reference to a timing chart in FIG. 13. FIG. 13 is a timing chart continuing from FIG. 11 and illustrates a case where the CPU 61 executes polarity detection for the driving circuit 5. The driving circuit 5 illustrated on the upper left side illustrates a state where the pulse generation circuit 691 has applied a detection pulse P4. The driving circuit 5 illustrated on the upper right side indicates a state where a detection signal DS2 is detected. Here, it is assumed that the actual polarity has changed to 0 due to an impact.

After the impact, at a time point T4, the CPU 61 resumes the software processing, whereby a software processing resume period Pr starts. At a time point T5 during the software processing resume period Pr, the pulse generation circuit 691 applies the detection pulse P4 to the connection point O2 of the driving circuit 5. Then, the detection signal DS2 is generated at the connection point O1, and the level of the detection signal DS2 is LOW. Thus, the CPU 61 changes the watch internal polarity from 1 to 0. The timing of the time point T4 can be set as appropriate. Furthermore, the detection pulse P4 may be applied to the connection point O1 of the driving circuit 5 depending on the watch internal polarity before the impact. In that case, the relationship between the level of the detection signal DS2 and whether the watch internal polarity is changed varies depending on the watch internal polarity before the impact and to which of the connection points O1 and O2 of the driving circuit 5 the detection pulse P4 is applied.

FIG. 14 is an explanatory diagram illustrating the relationship between the polarity and the detection result at the time of polarity detection. If the polarity before the impact is 0 and the detection pulse is applied from the connection point O1 to the connection point O2 (in-phase detection) and then a HIGH current pulse flowing from the connection point O2 to the ground is detected, the CPU 61 determines that the watch internal polarity matches the actual polarity. On the other hand, when the LOW current pulse flowing from the connection point O2 to the ground is detected, the CPU 61 determines that the watch internal polarity does not match the actual polarity.

If the polarity before the impact is 0 and the detection pulse is applied from the connection point O2 to the connection point O1 (reverse phase detection) and then a LOW current pulse flowing from the connection point O1 to the ground is detected, the CPU 61 determines that the watch internal polarity matches the actual polarity. On the other hand, when a HIGH current pulse flowing from the connection point O1 to the ground is detected, the CPU 61 determines that the watch internal polarity does not match the actual polarity.

If the polarity before the impact is 1 and the detection pulse is applied from the connection point O2 to the connection point O1 (in-phase detection) and then a HIGH current pulse flowing from the connection point O1 to the ground is detected, the CPU 61 determines that the watch internal polarity matches the actual polarity. On the other hand, when the LOW current pulse flowing from the connection point O1 to the ground is detected, the CPU 61 determines that the watch internal polarity does not match the actual polarity.

If the polarity before the impact is 1 and the detection pulse is applied from the connection point O1 to the connection point O2 (reverse phase detection) and then a LOW current pulse flowing from the connection point O2 to the ground is detected, the CPU 61 determines that the watch internal polarity matches the actual polarity. On the other hand, when a HIGH current pulse flowing from the connection point O2 to the ground is detected, the CPU 61 determines that the watch internal polarity does not match the actual polarity.

FIG. 15 is an explanatory diagram illustrating whether the polarity before the impact and the current polarity are shifted from each other, based on the detection result in FIG. 14. Specifically, in FIG. 14, when the polarity before the impact matches the actual polarity, the polarity is unchanged from that before the impact. Thus, there is no shift in polarity. On the other hand, when the polarities do not match, the polarity has changed from that before the impact. Thus, there is a shift in polarity.

In the case illustrated in FIG. 13, the polarity (internal polarity) before the impact is "1", the detection pulse P4 for in-phase detection is input, and the LOW current pulse flowing from the connection point O1 to the ground is detected. The CPU 61 determines that the polarities do not match in FIG. 14, and detects that there is a shift in polarity in FIG. 15.

Figure 16:
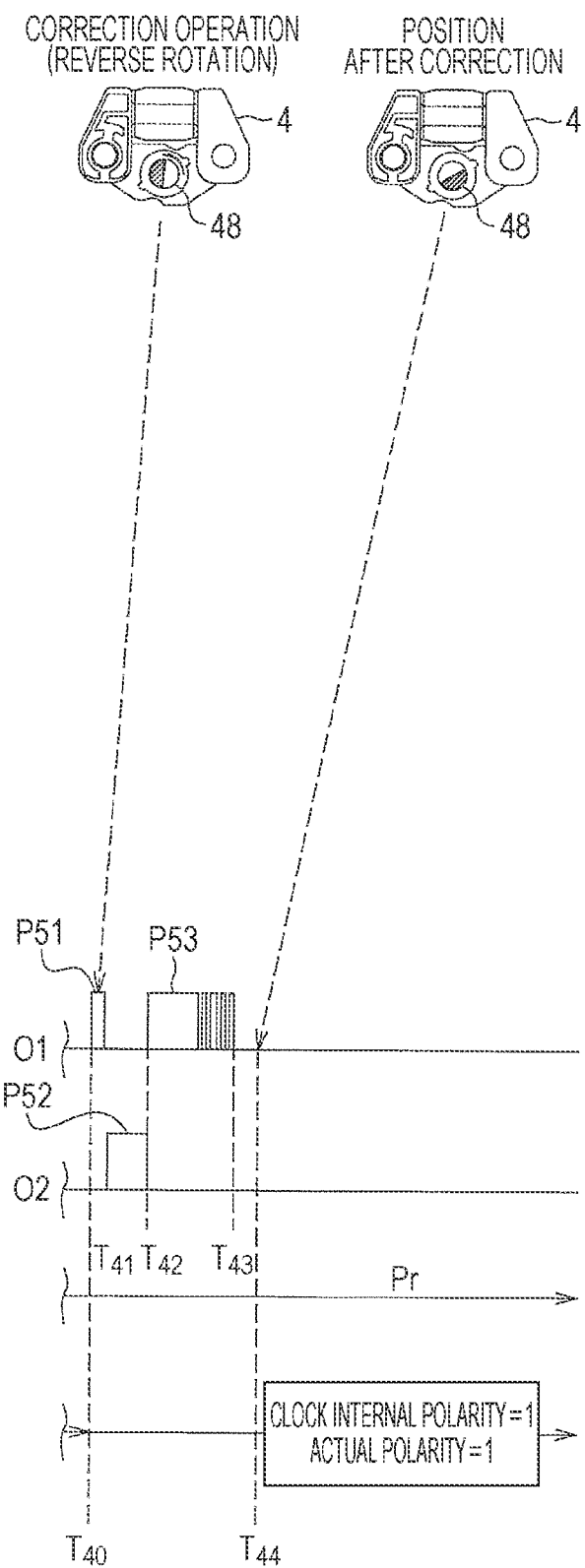
FIG. 16 is a timing chart illustrating processing of correcting the polarity because the rotor of the stepping motor has forward rotation shift in a forward rotation direction.

FIG. 16 is a timing chart illustrating processing of correcting the polarity because the rotor 48 of the stepping motor 4 has forward rotation shift in the forward rotation direction.

All the timings in FIG. 16 are within the software processing resume period Pr. At a time point T40, the pulse generation circuit 691 applies a pulse P51 to the connection point O1. The stepping motor 4 on the upper left side in FIG. 16 indicates the corrected position of the rotor 48 at the time point T40. At a time point T41, the pulse generation circuit 691 applies a pulse P52 to the connection point O2. Then, from a time point T42 to a time point T43, the pulse generation circuit 691 applies a reverse rotation pulse P53 to the connection point O1 to correct the position of the rotor 48. The stepping motor 4 on the upper right side in FIG. 16 indicates the corrected position of the rotor 48 at a time point T44.

The correction timing may be any appropriate timing and may be adjusted to the next pointer movement timing, for example. Furthermore, when the pointer 2 is moved by the impact to the position where the pointer 2 was supposed to be positioned at the next pointer movement timing, this correction may be omitted.

CPU Processing According to First Embodiment

Figure 17:
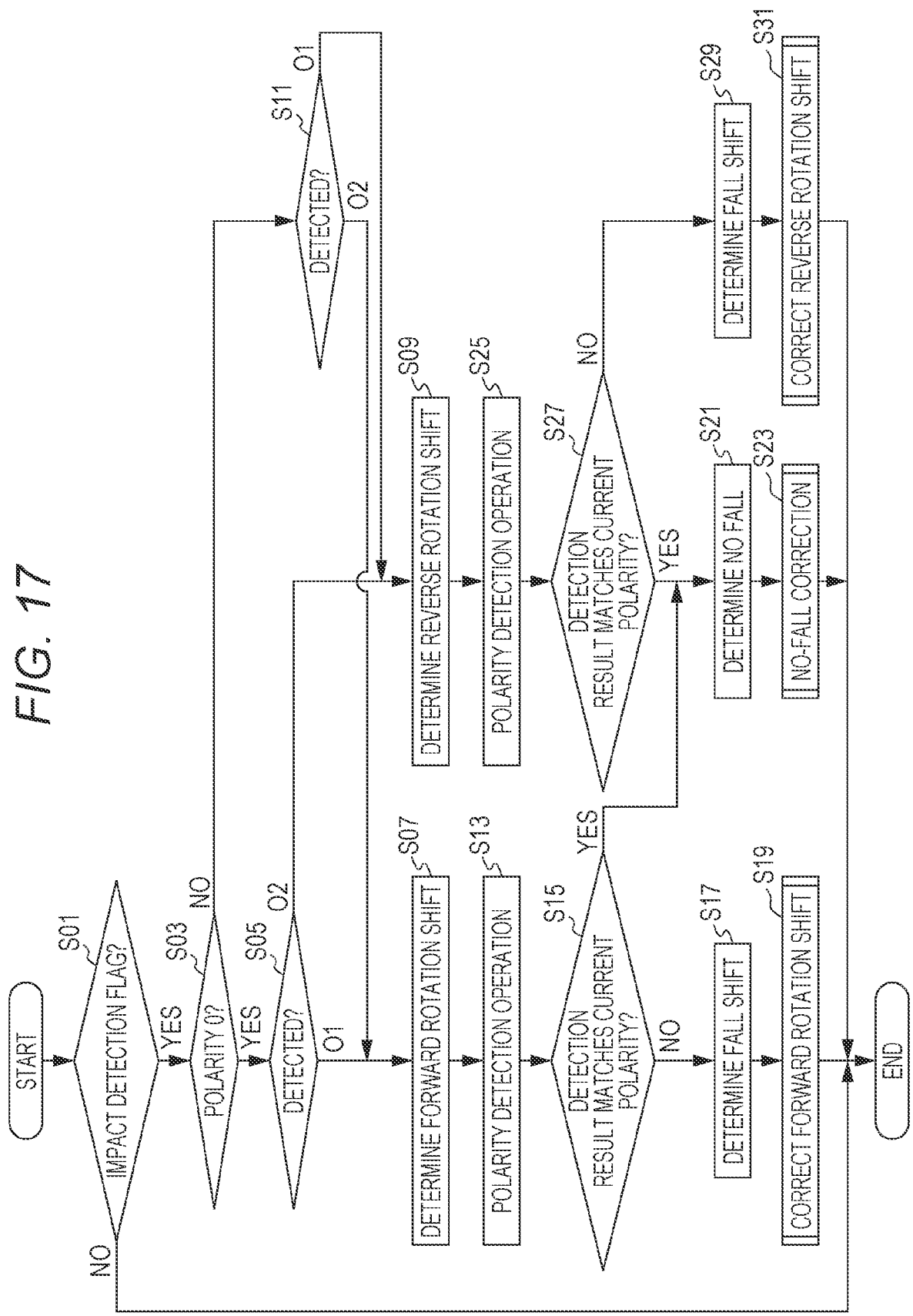
FIG. 17 is a flowchart illustrating correction processing executed by the CPU in the first embodiment.

Next, correction processing executed by the CPU 61 will be described with reference to a flowchart. FIG. 17 is a flowchart illustrating the correction processing executed by the CPU 61 in the first embodiment.

The CPU 61 determines whether the impact detection flag (which is the above-mentioned fall flag) is set (step S01). When the impact detection flag is determined to be not set (NO) in step S01, the CPU 61 ends the processing in FIG. 17.

In the determination in step S01, when the impact detection flag is set (YES), the CPU 61 determines whether the watch internal polarity is 0 (step S03).

When the watch internal polarity is determined to be 0 in the determination in step S03 (YES), the CPU 61 determines from which of the connection points O1 and O2 the current pulse flowing to the ground has been detected (step S05).

When the current pulse flowing from the connection point O1 to the ground is detected in the determination in step S05, the CPU 61 determines that the rotor 48 may have forward rotation shift (step S07).

On the other hand, when the current pulse flowing from the connection point O2 to the ground is detected in the determination in step S05, the CPU 61 determines that the rotor 48 may have reverse rotation shift (step S09).

When the watch internal polarity is not determined to be 0 in the determination in step S03 (NO), the CPU 61 determines from which of the connection points O1 and O2 the current pulse flowing to the ground has been detected (step S11).

When the current pulse flowing from the connection point O1 to the ground is detected in the determination in step S11, the CPU 61 determines that the rotor 48 may have reverse rotation shift (step S09).

On the other hand, when the current pulse flowing from the connection point O2 to the ground is detected in the determination in step S11, the CPU 61 determines that the rotor 48 may have forward rotation shift (step S07).

Then, the CPU 61 executes a polarity detection operation (step S13). In this case, the CPU 61 causes the pulse generation circuit 691 to apply a polarity detection pulse to detect the current polarity of the rotor 48.

The CPU 61 determines whether the detection result of the polarity of the rotor 48 matches the current polarity (step S15). When the polarities of the rotor 48 do not match in the determination in step S15 (NO), the CPU 61 determines that a polarity shift has occurred due to the fall (step S17). In this case, the CPU 61 executes forward rotation shift correction processing illustrated in FIG. 18 described later (step S19), and ends the processing in FIG. 17.

On the other hand, when the polarities of the rotor 48 match in the determination in step S15 (YES), the CPU 61 determines that there is no shift due to the fall (step S21), and the processing proceeds to step S23.

Furthermore, in step S09, after determining that the rotor 48 may have reverse rotation shift, the CPU 61 executes the polarity detection operation (step S25). In this case, the CPU 61 causes the pulse generation circuit 691 to apply a detection pulse to detect the current polarity of the rotor 48.

The CPU 61 determines whether the detection result of the polarity of the rotor 48 matches the current polarity (step S27). When the polarities of the rotor 48 do not match in the determination in step S27 (NO), the CPU 61 determines that a polarity shift has occurred due to the fall (step S29). In this case, the CPU 61 executes reverse rotation shift correction processing illustrated in FIG. 19 described later (step S31), and ends the processing in FIG. 17.

On the other hand, when the polarities of the rotor 48 match in the determination in step S27 (YES), the CPU 61 determines that there is no shift due to the fall (step S21). In this case, the CPU 61 executes no-fall correction processing illustrated in FIG. 20 described later (step S23), and ends the processing in FIG. 17.

<Forward Rotation Shift Correction Processing>

Next, the forward rotation shift correction processing executed by the CPU 61 will be described with reference to a flowchart.

Figure 18:
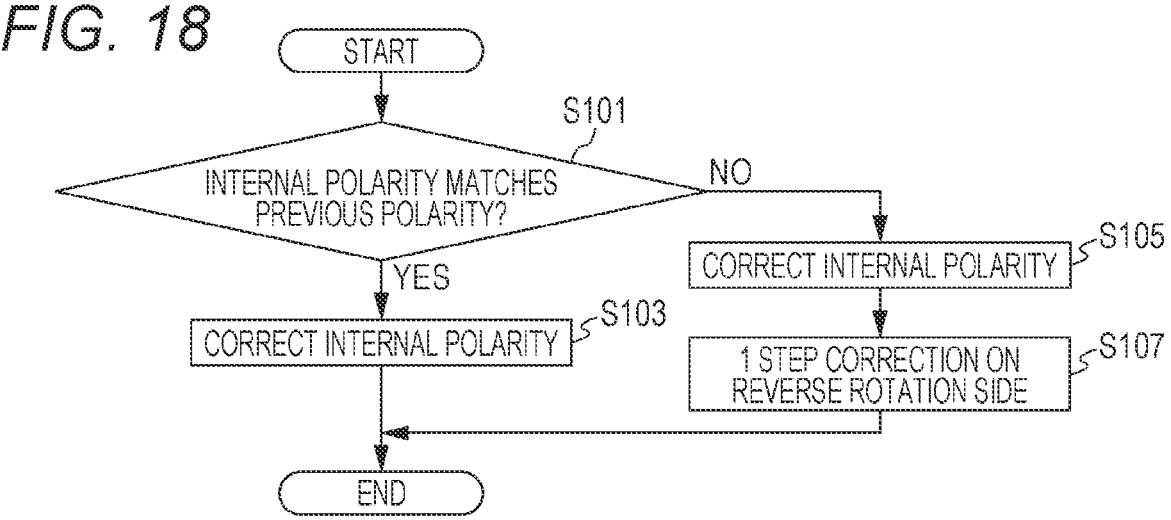
FIG. 18 is a flowchart illustrating forward rotation shift correction processing.

FIG. 18 is a flowchart illustrating the forward rotation shift correction processing executed by the CPU 61.

The CPU 61 determines whether the watch internal polarity matches the previously detected polarity (referred to as previous polarity) (step S101). Here, the previous polarity is the polarity immediately before the latest pulse applied for rotating the rotor 48. When the polarities match in the determination in step S101 (YES), the CPU 61 corrects the watch internal polarity (step S103), and ends the forward rotation shift correction processing in FIG. 18.

Here, the previous polarity and the watch internal polarity is in such a relationship that the previous polarity is the polarity one second before the watch internal polarity, and thus basically, the polarity changes every second. Therefore, in the forward rotation shift correction processing, when the watch internal polarity and the previous polarity match (YES in step S101), it means that the rotor 48 has rotated toward the forward rotation side by one step (ahead). Thus, the CPU 61 corrects the watch internal polarity toward the opposite polarity by a single drive pulse. Specifically, the CPU 61 corrects the watch internal polarity to "0" if the watch internal polarity is "1", and corrects the watch internal polarity to "1" if the watch internal polarity is "0" (step S103).

On the other hand, when the polarities do not match in the determination in step S101 (NO), the CPU 61 corrects the watch internal polarity (step S105). In the forward rotation shift correction processing, when the watch internal polarity and the previous polarity do not match (NO in step S101), it means that the rotor 48 has rotated toward the forward rotation side by two steps (ahead) (step S105). Thus, the CPU 61 performs correction by rotating the rotor 48 one step toward the reverse rotation side (step S107), and ends the forward rotation shift correction processing in FIG. 18.

<Reverse Rotation Shift Correction Processing>

Next, the reverse rotation shift correction processing executed by the CPU 61 will be described with reference to a flowchart.

Figure 19:
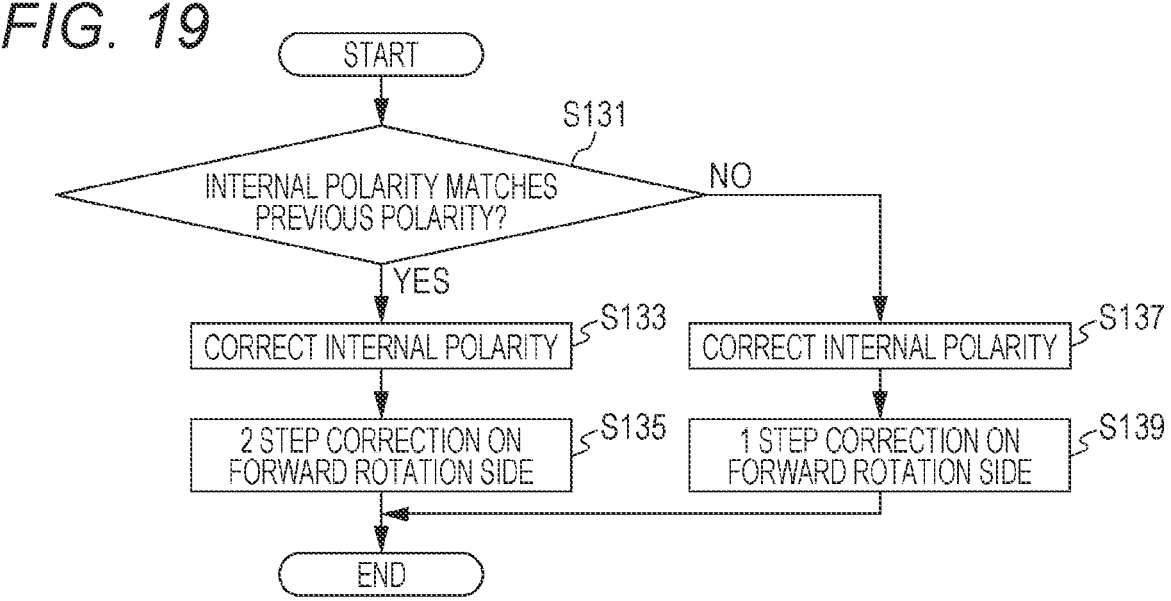
FIG. 19 is a flowchart illustrating reverse rotation shift correction processing.

FIG. 19 is a flowchart illustrating the reverse rotation shift correction processing executed by the CPU 61.

The CPU 61 determines whether the watch internal polarity matches the previous polarity (step S131). When the polarities match in the determination in step S131 (YES), the CPU 61 corrects the watch internal polarity (step S133).

In the reverse rotation shift correction processing, when the watch internal polarity and the previous polarity match (YES in step S131), it means that the rotor 48 has rotated toward the reverse rotation side by one step. Thus, the CPU 61 corrects the watch internal polarity toward the opposite polarity by a single drive pulse. Specifically, the CPU 61 corrects the watch internal polarity to "0" if the watch internal polarity is "1", and corrects the watch internal polarity to "1" if the watch internal polarity is "0" (step S133).

Then, the CPU 61 performs correction by rotating the rotor 48 two steps toward the forward rotation side (step S135), and ends the reverse rotation shift correction processing in FIG. 19.

On the other hand, when the polarities do not match in the determination in step S131 (NO), the CPU 61 corrects the watch internal polarity (step S137). In the reverse rotation shift correction processing, when the watch internal polarity and the previous polarity do not match (NO in step S131), it means that the rotor 48 has not rotated (not ahead) (step S137). Thus, the CPU 61 performs correction by rotating the rotor 48 one step toward the forward rotation side (ahead) (step S139), and ends the reverse rotation shift correction processing in FIG. 19.

<No-Fall Correction Processing>

Next, the no-fall correction processing executed by the CPU 61 will be described with reference to a flowchart.

Figure 20:
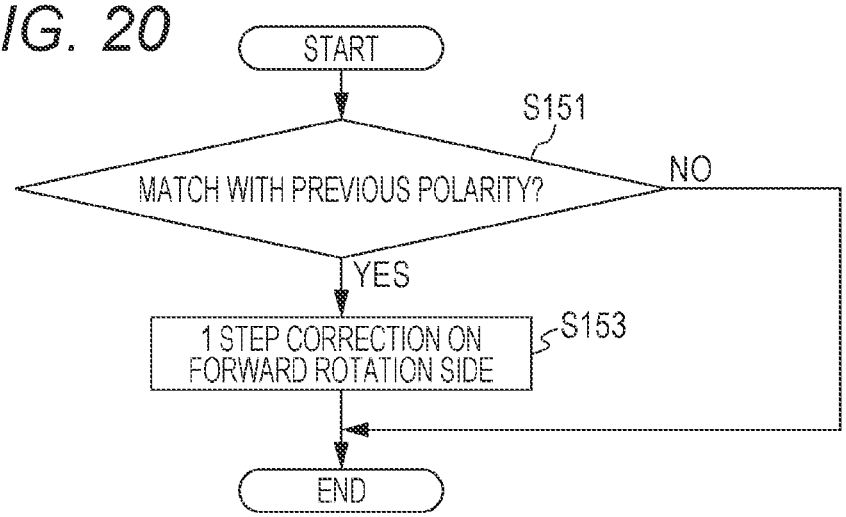
FIG. 20 is a flowchart illustrating no-fall correction processing.

FIG. 20 is a flowchart illustrating the no-fall correction processing executed by the CPU 61.

The CPU 61 determines whether the watch internal polarity matches the previous polarity (step S151). When the polarities match (YES) in the determination in step S151, the CPU 61 performs correction by rotating the rotor 48 one step toward the forward rotation side (ahead) to compensate for the single drive pulse cancellation at the time of previous polarity (step S153), and ends the no-fall correction processing in FIG. 20.

On the other hand, when the polarities do not match (NO) in the determination in step S151, the CPU 61 determines that no correction is required and ends the no-fall correction processing in FIG. 20. This is because despite the single drive pulse cancellation at the time of previous polarity, there has been a movement by a second (that is, by a single pulse) due to an impact.

For example, as in the analog electronic watch described in JP 2005-172677 A, a pointer may be shifted by slipping even when braking control is performed on a step motor at a timing when an impact is detected.

However, as described above, with the electronic watch 1 according to the first embodiment, the impact is detected based on the electromotive force detected by the A/D converter 702, and the position of the pointer 2 can be corrected based on the pattern of the electromotive force detected by the A/D converter 702 at the time when the impact is detected.

As a result, the electronic watch 1 according to the first embodiment can correct the shifting of a pointer of an electronic watch due to an impact to improve the product reliability.

Furthermore, the CPU 61 can correct the pointer position by moving the position of the pointer 2 by one step.

Second Embodiment

In the first embodiment, in FIG. 11, the current IP1 is a current pulse based on the first peak of electromotive force. Alternatively, the position of the pointer 2 may be corrected based on a plurality of peaks of the electromotive force.

In this case, for example, the CPU 61 can correct the position of the pointer 2 by determining whether, after the first peak of the electromotive force detected by the A/D converter 702, another peak of the electromotive force occurs in a direction opposite to the peak of the electromotive force.

Figure 21:
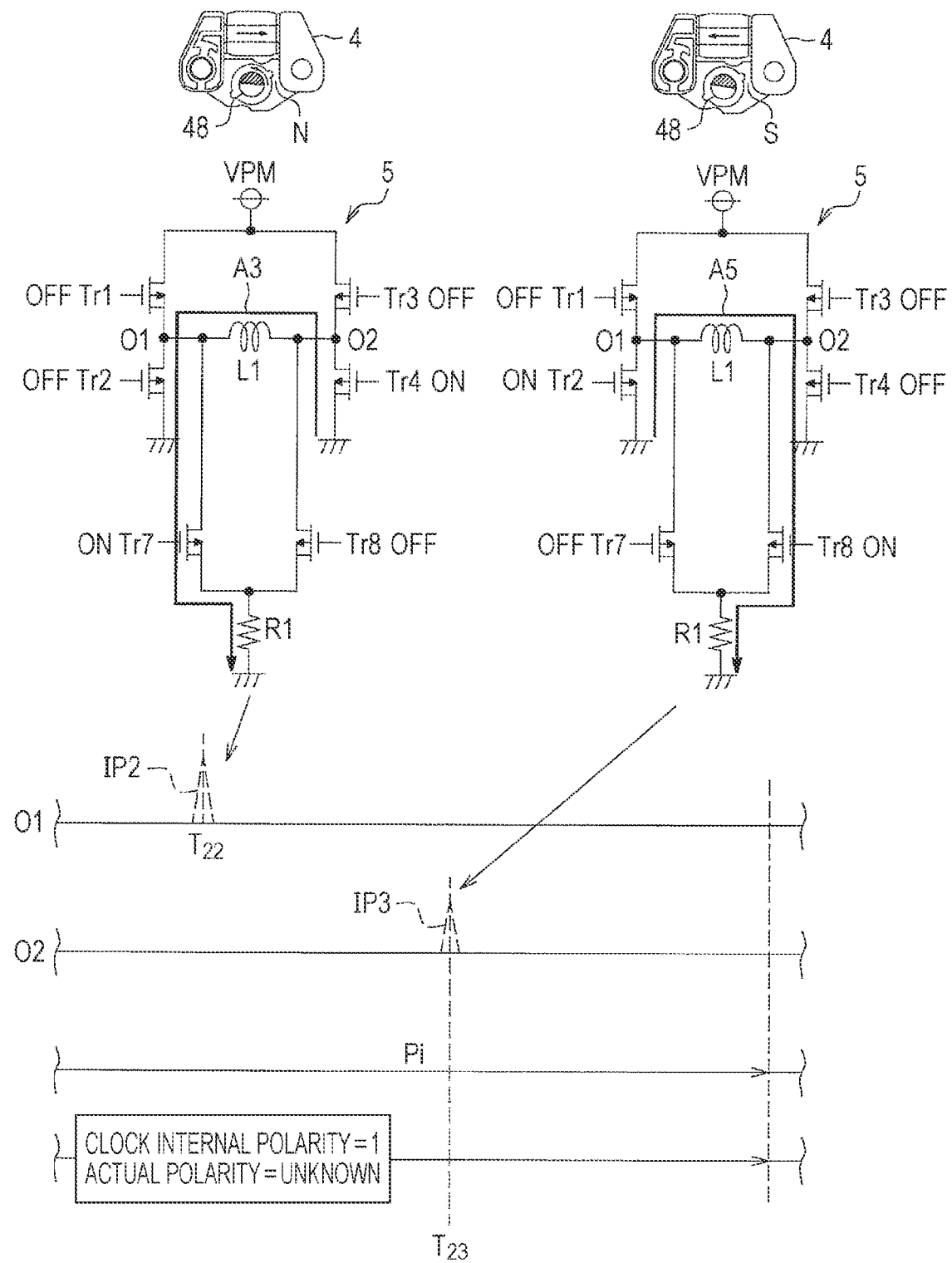
FIG. 21 is a timing chart illustrating a case where a peak of electromotive force occurs in a direction opposite to the first peak of the electromotive force after a current based on the first peak of the electromotive force has been detected, in FIG. 11.

FIG. 21 is a timing chart illustrating a case where a peak of electromotive force occurs in the direction opposite to the first peak of the electromotive force after the current IP1 based on the first peak of the electromotive force has been detected, in FIG. 11.

FIG. 21 continues from FIG. 11. At the time point T21 in FIG. 11, the CPU 61 causes the A/D converter 702 to detect the current IP1 flowing from the connection point O2 to the ground through the resistor R1. Then, the CPU 61 repeats the control pattern of the series of switch elements illustrated in FIG. 7.

The CPU 61 determines whether the current pulse flowing through the resistor R1 is detected from the connection point O1 on the opposite side of the connection point O2. At the time point T22, the CPU 61 turns ON the switch elements Tr4 and Tr7 and turns OFF the switch elements Tr2 and Tr8, as illustrated in the circuit diagram on the left side in FIG. 21. The stepping motor 4 on the upper left side in FIG. 21 indicates the position and rotation direction of the rotor 48 and the direction of the magnetic flux of the coil L1 at the time point T22. At the time point, the A/D converter 702 detects a current IP2 flowing from the connection point O1 to the ground through the resistor R1.

At the time point T23, the CPU 61 turns ON the switch elements Tr2 and Tr8 and turns OFF the switch elements Tr4 and Tr7, as illustrated in the circuit diagram on the right side in FIG. 21. The stepping motor 4 on the upper right side in FIG. 21 indicates the position of the rotor 48 and the direction of the magnetic flux of the coil L1 at the time point T23. At the time point, the A/D converter 702 detects a current IP3 flowing from the connection point O2 to the ground through the resistor R1.

An interval between the detection of the current IP1 and the detection of the current IP2 can be adjusted, for example, to be 1 [ms] to 6 [ms]. When the period of FIGS. 5A and 6A is 570 [μs] and the period of FIGS. 5B and 6B is 30 [μs], the first and the second peaks of the electromotive force can be ignored. The number of times a peak of the electromotive force occurs in the opposite direction can be detected, for example, 10 times at the maximum. When no first electromotive force peak is detected, it can be determined that there is no pointer shift.

For example, when the first peak of the electromotive force detected by the A/D converter 702 is in the positive direction and a peak in a direction opposite to the immediately preceding peak is detected for an odd number of times after the first peak, the CPU 61 corrects the position of the pointer 2. When the first peak of the electromotive force detected by the A/D converter 702 is in the positive direction and a peak in a direction opposite to the immediately preceding peak is detected for an even number of times, the CPU 61 does not correct the position of the pointer 2.

Thus, the CPU 61 can adjust the position of the pointer 2 without determining the polarity of the rotor 48 based on the detection pulse.

Figure 22:
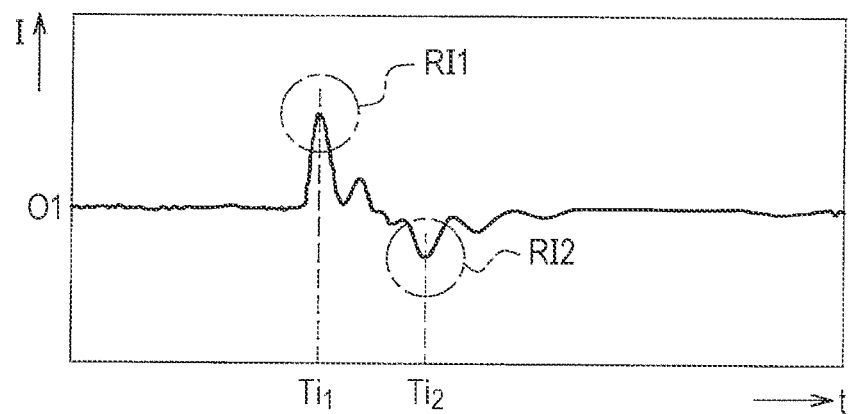
FIG. 22 represents experimental data illustrating a case where the first peak of the electromotive force detected by the A/D converter is in a positive direction and a peak in a direction opposite to the immediately preceding peak is detected once after the first peak.

FIG. 22 is a graph illustrating a case where the first peak of the electromotive force detected by the A/D converter 702 is in the positive direction and a peak in a direction opposite to the immediately preceding peak is detected once (an odd number of times) after the first peak. The vertical axis of the graph represents the value of the current flowing from the connection point O1 to the ground. The horizontal axis of the graph represents the elapse of time.

As illustrated in FIG. 22, at a time point Ti1, a first peak RI1 of the electromotive force is detected in the positive direction. At a time point Ti2, a peak RI2 of electromotive force is detected in a negative direction. When the first peak RI1 is detected in the positive direction, and then the peak RI2 is detected in the negative direction in this manner, the position of the pointer 2 is not shifted as long as no further peak is detected in the positive direction. Thus, the CPU 61 does not correct the pointer 2.

For example, the positive direction corresponds to a current flowing from the connection point O1 toward the ground, whereas the negative direction corresponds to a current flowing from the ground toward the connection point O1. At the connection point O2 which is a counterpart of the connection point O1, the positive and negative correspond to opposite directions. Specifically, the positive direction corresponds to the current flowing from the ground toward the connection point O2, and the negative direction corresponds to the current flowing from the connection point O2 toward the ground. Accordingly, the peak detection can be defined as detecting a positive current at the connection point O1 or detecting a negative current at the connection point O2.

Figure 23:
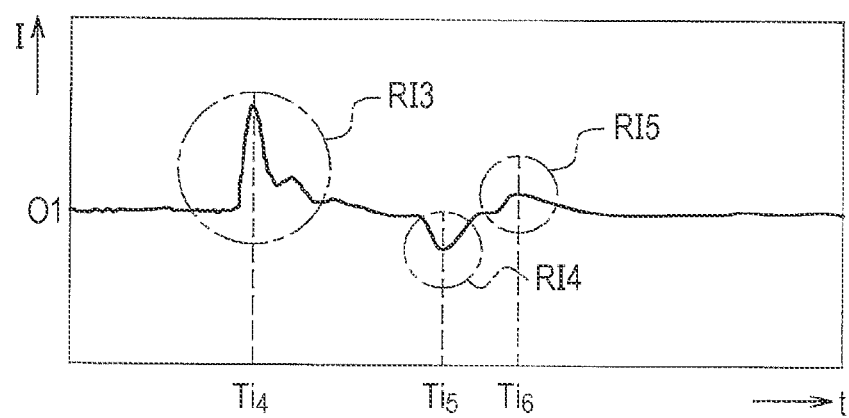
FIG. 23 represents experimental data illustrating a case where the first peak of the electromotive force detected by the A/D converter is in the positive direction and a peak in a direction opposite to the immediately preceding peak is detected twice after the first peak.

FIG. 23 is a graph illustrating a case where the first peak of the electromotive force detected by the A/D converter 702 is in the positive direction and a peak in a direction opposite to the immediately preceding peak is detected twice (an even number of times) after the first peak. The vertical axis of the graph represents the value of the current flowing from the connection point O1 to the ground. The horizontal axis of the graph represents the elapse of time.

As illustrated in FIG. 23, at a time point Ti4, a first peak RI3 of the electromotive force is detected in the positive direction. At a time point Ti5, a peak RI4 of electromotive force is detected in a negative direction. At a time point Ti6, a peak RI5 of electromotive force is detected in a negative direction.

When the first peak RI3 is detected in the positive direction, and then the peak RI4 is detected in the negative direction in this manner, the position of the pointer 2 is shifted when a further peak RI5 is detected in the positive direction. Therefore, the CPU 61 corrects the position of the pointer 2. In this case, since the first peak of the electromotive force detected by the A/D converter 702 is in the positive direction, the CPU 61 moves the pointer 2 in the reverse rotation direction to correct the position.

Figure 24:
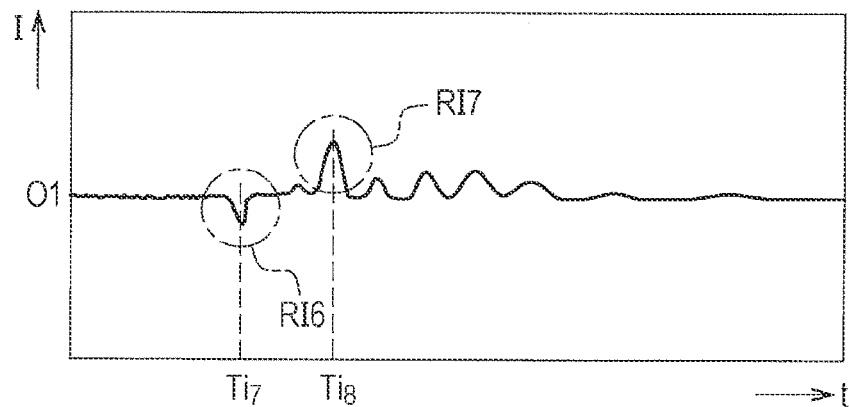
FIG. 24 represents experimental data illustrating a case where the first peak of the electromotive force detected by the A/D converter is in a negative direction and a peak in a direction opposite to the immediately preceding peak is detected once after the first peak.

FIG. 24 is a graph illustrating a case where the first peak of the electromotive force detected by the A/D converter 702 is in the negative direction and a peak in a direction opposite to the immediately preceding peak is detected once (an odd number of times) after the first peak. The vertical axis of the graph represents the value of the current flowing from the connection point O1 to the ground. The horizontal axis of the graph represents the elapse of time.

As illustrated in FIG. 24, at a time point Ti7, a first peak RI6 of the electromotive force is detected in the negative direction. At a time point Ti8, a peak RI7 of electromotive force is detected in the positive direction. When the first peak RI6 is detected in the negative direction and then the peak RI7 is detected in the positive direction, the position of the pointer 2 is corrected if no further peak is detected in the negative direction thereafter. In this case, since the first peak of the electromotive force detected by the A/D converter 702 is in the negative direction, the CPU 61 moves the pointer 2 in the forward rotation direction to correct the position.

Figure 25:
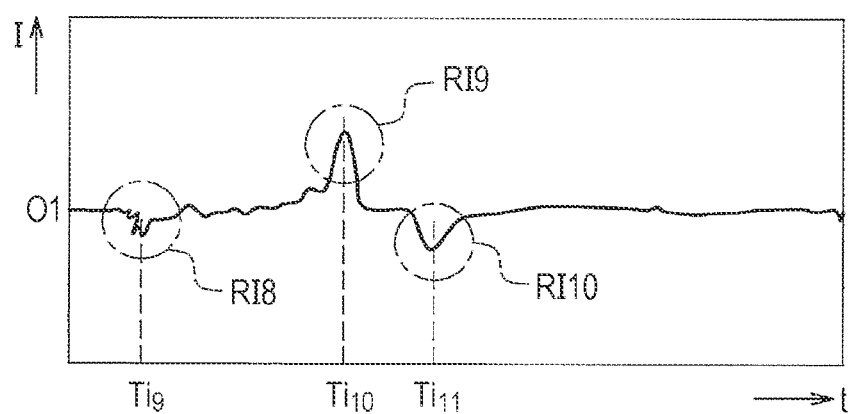
FIG. 25 represents experimental data illustrating a case where the first peak of the electromotive force detected by the A/D converter is in the negative direction and a peak in a direction opposite to the immediately preceding peak is detected twice after the first peak.

FIG. 25 is a graph illustrating a case where the first peak of the electromotive force detected by the A/D converter 702 is in the negative direction and a peak in a direction opposite to the immediately preceding peak is detected twice (an even number of times) after the first peak. The vertical axis of the graph represents the value of the current flowing from the connection point O1 to the ground. The horizontal axis of the graph represents the elapse of time.

As illustrated in FIG. 25, at the time point Ti9, the first peak RI8 of the electromotive force is detected in the negative direction. At a time point Ti10, a peak RI9 of electromotive force is detected in the positive direction. At a time point Ti11, a peak RI10 of electromotive force is detected in negative direction.

In this manner, when the first peak RI8 is detected in the negative direction, then the peak RI9 is detected in the positive direction, and the peak RI10 is further detected in the negative direction (an even number of times in the opposite direction), the CPU 61 does not correct the position of the pointer 2.

Figure 26:
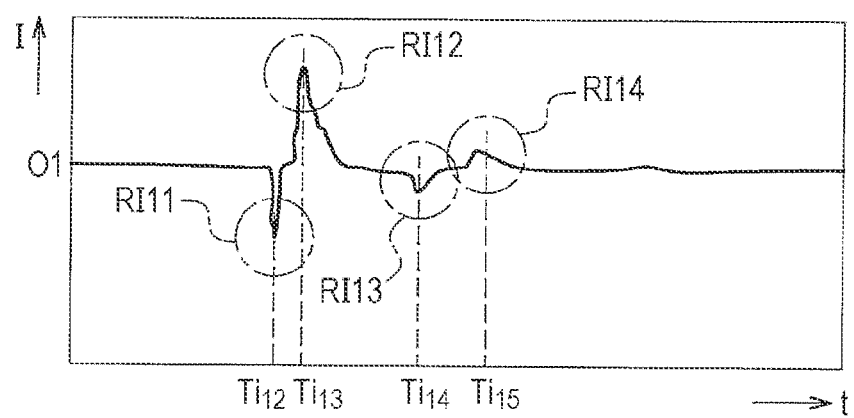
FIG. 26 represents experimental data illustrating a case where the first peak of the electromotive force detected by the A/D converter is in the negative direction and a peak in a direction opposite to the immediately preceding peak is detected three times after the first peak.

FIG. 26 is a graph illustrating a case where the first peak of the electromotive force detected by the A/D converter 702 is in the negative direction and a peak in a direction opposite to the immediately preceding peak is detected three times (an odd number of times) after the first peak. The vertical axis of the graph represents the value of the current flowing from the connection point O1 to the ground. The horizontal axis of the graph represents the elapse of time.

As illustrated in FIG. 26, at a time point Ti12, a first peak RI11 of the electromotive force is detected in the negative direction. At a time point Ti13, a peak RI12 of electromotive force is detected in the positive direction. At a time point Ti14, a peak RI13 of electromotive force is detected in a negative direction. At a time point Ti15, a peak RI14 of electromotive force is detected in a negative direction.

When the peak in a direction opposite to that of the immediately preceding peak is thus detected three times (odd number of times) after the first peak RI11 has been detected in the negative direction, the position of the pointer 2 is corrected. In this case, since the first peak of the electromotive force detected by the A/D converter 702 is in the negative direction, the CPU 61 moves the pointer 2 in the forward rotation direction to correct the position.

FIG. 27 is an explanatory diagram illustrating the relationship between the polarity before the impact and a terminal at the time of detection corresponding to the experimental data in FIGS. 22 to 26.

As illustrated in the first line of FIG. 27, a case is considered where the polarity before the impact is 0, the forward rotation direction shift is determined to have occurred, the first detection is made at the connection point O1, the second detection is made at the connection point O2, and the third detection is made at the connection point O1. In this case, the position of the pointer 2 may be corrected by one step in the reverse rotation direction.

As illustrated in the second line, a case is considered where the polarity before the impact is 0, the reverse rotation direction shift is determined to have occurred, the first detection is made at the connection point O2, the second detection is made at the connection point O1, the third detection is made at the connection point O2, and the fourth detection is made at the connection point O1. In this case, the position of the pointer 2 may be corrected by one step in the forward rotation direction.

As illustrated in the third line, a case is considered where the polarity before the impact is 1, the reverse rotation direction shift is determined to have occurred, the first detection is made at the connection point O1, the second detection is made at the connection point O2, the third detection is made at the connection point O1, and the fourth detection is made at the connection point O2. In this case, the position of the pointer 2 is not corrected.

As illustrated in the fourth line, a case is considered where the polarity before the impact is 1, the forward rotation direction shift is determined to have occurred, the first detection is made at the connection point O2, the second detection is made at the connection point O1, and the third detection is made at the connection point O2. In this case, the position of the pointer 2 is not corrected.

As described above, with the electronic watch 1 according to the second embodiment, the CPU 61 can correct the position of the pointer 2 based on the peak of the electromotive force detected by the A/D converter 702. In particular, the CPU 61 can correct the position of the pointer 2 based on the first peak of the electromotive force detected by the A/D converter 702.

Third Embodiment

Next, an electronic watch according to the third embodiment will be described. In the following description, parts corresponding to those in the first embodiment will be denoted with the same reference numerals and description thereof will be omitted as appropriate. The overall configuration of the electronic watch of the present embodiment is the same as that of the first embodiment, except that the stepping motor 4 and the driving circuit 5 in the first embodiment are replaced with a stepping motor 140 illustrated in FIG. 28 and a driving circuit 150 illustrated in FIG. 29.

Figure 28:
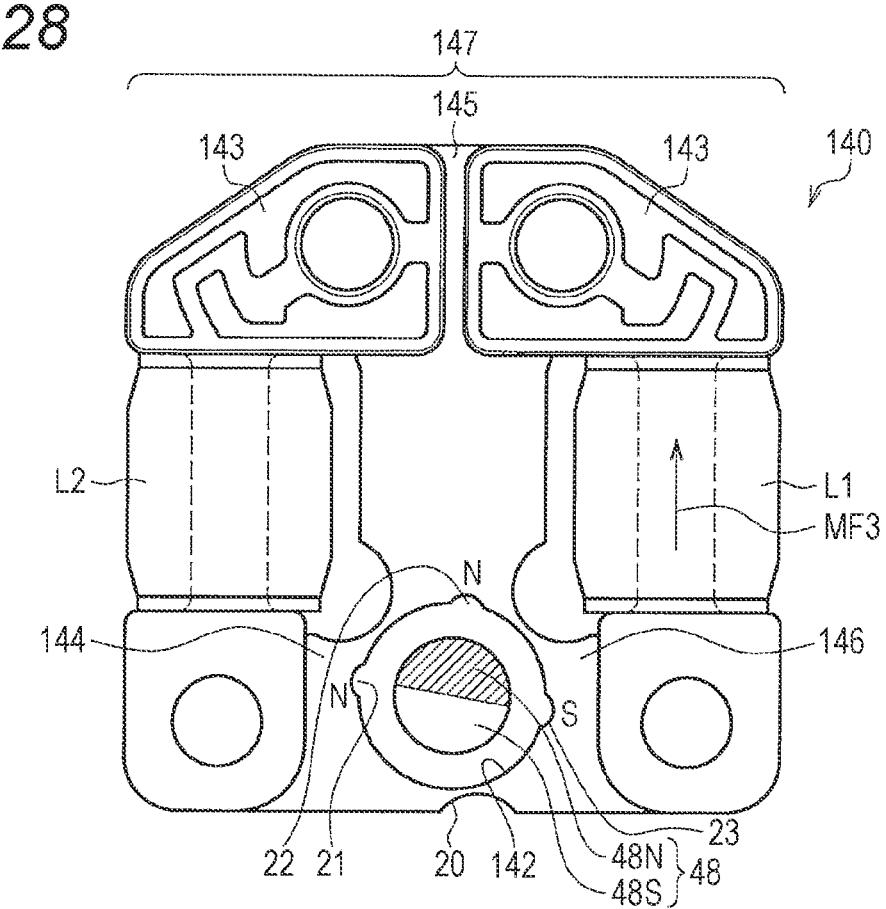
FIG. 28 is a plan view of the stepping motor adopted in a third embodiment.

FIG. 28 is a plan view of the stepping motor 140 adopted in the present embodiment. The stepping motor 140 is a dual core type motor and includes a stator 147 and a rotor 48. The configuration of the rotor 48 is the same as that in the first embodiment. In the present embodiment, the rotor 48 can rotate in any one of the counterclockwise direction or the clockwise direction by a predetermined step angle, when the drive pulse is applied to a coil L1 (first coil) and a coil L2 (second coil) described later. In the present embodiment, the step angle is 180 degrees.

The coil L1 (first coil) detects a peak of electromotive force. The coil L2 (second coil) inputs a drive pulse and determines the polarity. The CPU 61 alternately puts the coil L1 (first coil) and the coil L2 (second coil) in a high impedance state.

The stator 147 includes a substantially rectangular center yoke 145, a pair of side yokes 144 and 146 arranged below the center yoke 145, and the coils L1 and L2. The side yokes 144 and 146 are provided substantially symmetrically on the left and right sides to surround the rotor 48. The coil L1 (first coil) and the coil L2 (second coil) are inserted between the upper end of the center yoke 145 and the side yokes 144 and 146. The coils L1 and L2 are connected to a driving circuit 150 described later via a pair of terminal blocks 143.

A substantially circular hole 142 is formed in the stator 147 at the intersection between the lower end of the center yoke 145 and the pair of side yokes 144 and 146, and the rotor 48 is arranged in this hole 142. In the excited state, the stator 147 has three magnetic poles appearing along the outer circumference of the rotor 48, that is, appearing near the center yoke 145, near the side yoke 144, and near the side yoke 146. The polarities of the three magnetic poles of the stator 147 are switched when the drive pulse is applied to the coils L1 and L2. Furthermore, an arcuate recess 20 is formed below the hole 142 at a connection portion between the side yokes 144 and 146.

The coil L1 has one end magnetically connected to the center yoke 145, and has the other end side magnetically connected to the free end of the side yoke 146. The coil L2 has one end side magnetically connected to the center yoke 145, and has the other end side magnetically connected to the free end of the side yoke 144.

In the present embodiment, the pulse generation circuit 691 (see FIG. 2) applies the drive pulse to the coils L1 and L2. When this results in a magnetic flux generated from the coils L1 and L2, this magnetic flux flows along the magnetic cores of the coils L1 and L2 and the stator 147 magnetically connected thereto. Thus switching of the three magnetic poles is implemented as appropriate.

Furthermore, three recesses 21, 22, and 23 are formed on the inner circumference surface of the hole 142. The recesses 21, 22, and 23 are formed in a direction inclined by about 10 degrees in a counterclockwise direction with respect to the direction of the center yoke 145 and in two directions orthogonal to this. The recesses 21, 22, and 23 can maintain the stationary state of the rotor 48. In the present embodiment, the stepping motor 140 has the highest index torque (holding torque) when the polarization directions of the rotor 48 are opposed to each other in the directions inclined clockwise by about 80 degrees and about 260 degrees with respect to the direction of the center yoke 145.

Thus, the stop position illustrated in FIG. 28 or the stop position as a result of the rotation by 180 degrees from this stop position is the stable position according to the present embodiment. In FIG. 28, a magnetic flux MF3 generated at each portion of the stator 147 while the coils L1 and L2 are in the non-energized state is indicated by a dashed arrow. The position near the recesses 20 and 23 is a position where the cross-sectional areas of the side yokes 144 and 146 become the smallest (or a minimum value appears in the cross-sectional area), and magnetic saturation is likely to occur.

Also in the present embodiment, due to various factors, the rotor 48 may stop at a position other than the stable position, that is, an unstable position. The torque characteristics in the present embodiment are the same as those in the first embodiment. Therefore, in the present embodiment, the unstable position where the rotor 48 is highly likely to stop is a 90-degree or 270-degree position, when the stop position illustrated in FIG. 28 is defined as 0 degrees.

Figure 29:
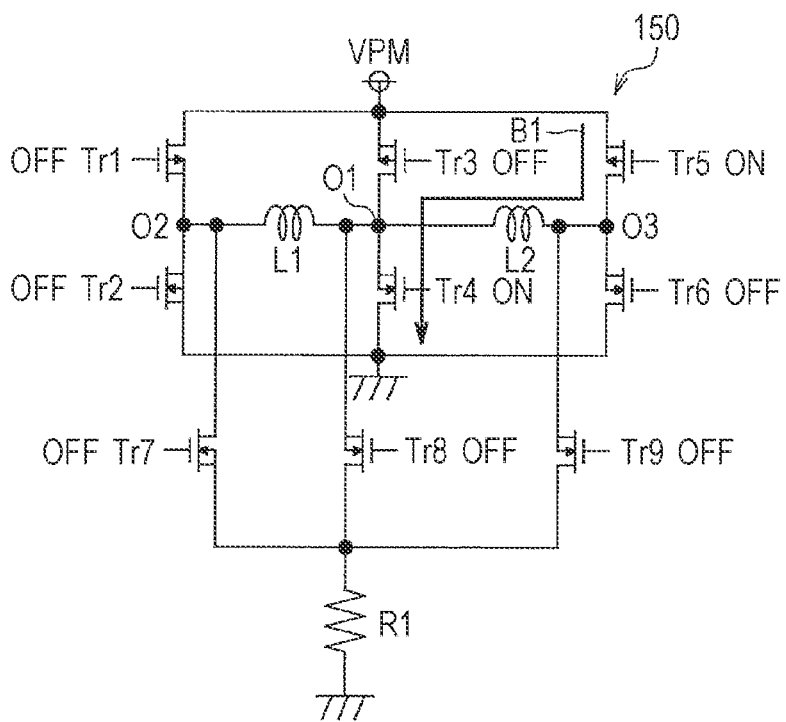
FIG. 29 is a circuit diagram of the driving circuit adopted in the third embodiment.

FIG. 29 is a circuit diagram of the driving circuit 150 adopted in the present embodiment. The driving circuit 150 is for applying the pulse generated by the pulse generation circuit to the two coils L1 and L2, and has an H-bridge circuit including switch elements Tr1 to Tr6 including MOSFETs, for example. Switch elements Tr7 to Tr9 and the resistor R1 form a discharge circuit that discharges the energy stored in the coils L1 and L2.

The power supply unit 7 applies a power supply voltage Vcc between a power supply terminal and a ground terminal of the driving circuit 150 (see FIG. 1). The switch elements Tr1 and Tr2 are connected in series via a connection point O2, the switch elements Tr3 and Tr4 are connected in series via a connection point O1, and the switch elements Tr5 and Tr6 are connected in series via a connection point O3 between the voltage terminal and the ground terminal. A resistor R1 has one end connected to the ground terminal, the switch element Tr7 is connected between the connection point O2 and the other end of the resistor R1, the switch element Tr8 is connected between the connection point O1 and the other end of the resistor R1, and the switch element Tr9 is connected between the connection point O3 and the other end of the resistor R1.

The stepping motor 140 has the coil L1 connected between the connection points O1 and O2, and has the coil L2 connected between the connection points O1 and O3.

When the switch elements Tr4 and Tr5 are turned ON, and the switch elements Tr1 to Tr3 and Tr6 are turned OFF with the power supply voltage Vcc applied to the power supply terminal of the driving circuit 150, the power supply voltage Vcc is applied between the connection point O3 and the connection point O1, and the current flows along a path B1. In this case, a magnetic flux MF3 is generated in the coil L1 in a direction indicated by the arrow (see FIG. 28). In this case, the rotor 48 rotates clockwise in the drawing. In the present embodiment, the clockwise rotation is defined as forward rotation, and the position of the rotor 48 in FIG. 28 is defined as polarity 0. Note that these directions and polarity of the magnetic flux are examples, and the present invention is not limited to these.

Figure 30:
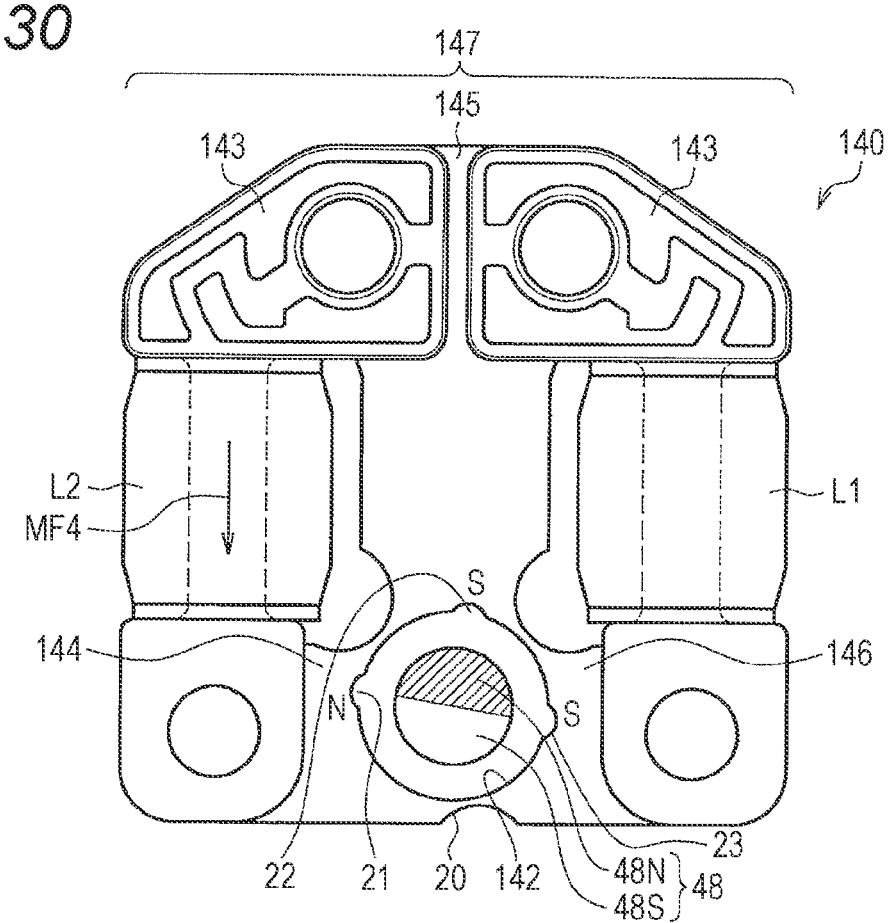
FIG. 30 is a plan view of the stepping motor adopted in the third embodiment.
Figure 31:
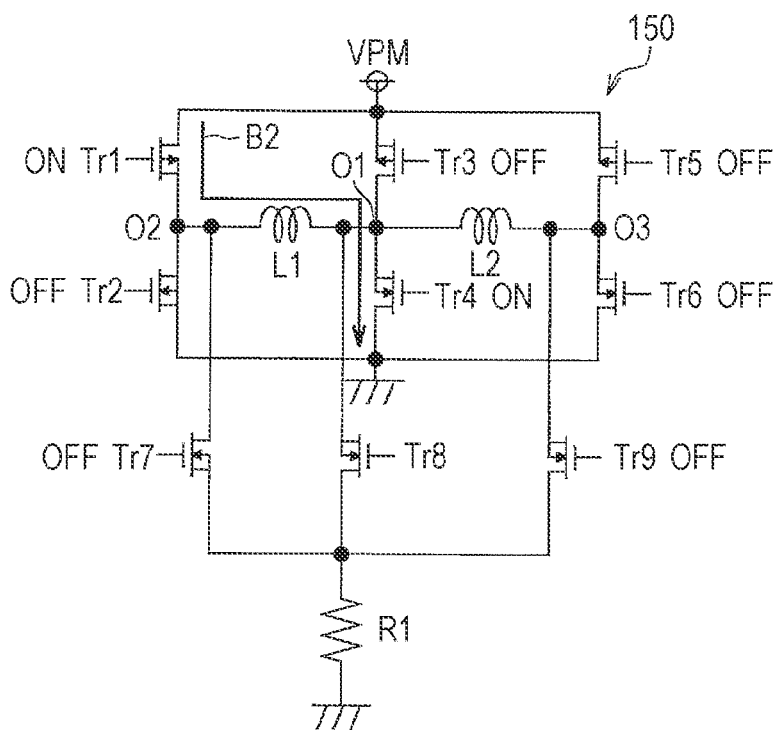
FIG. 31 is a circuit diagram of the driving circuit adopted in the third embodiment.

Furthermore, FIG. 30 is a plan view of the stepping motor 140 adopted in the third embodiment, and FIG. 31 is a circuit diagram of the driving circuit 150 adopted in the third embodiment.

As illustrated in FIG. 31, when the power supply voltage Vcc is applied to the connection point O2 to turn ON the switch elements Tr1 and Tr4 and turn OFF the switch elements Tr2, Tr3, Tr5, and Tr6 and the current flows from the connection point O2 to the connection point O1, the current flows along a path B2. In this case, a magnetic flux MF4 is generated in the coil L2 in a direction indicated by the arrow (see FIG. 29). In this case, the rotor 48 rotates clockwise in the drawing.

<Impact Detection>

Next, the impact detection according to the present embodiment will be described with reference to FIGS. 32 to 34. In the present embodiment, when the stepping motor 140 receives an impact, the rotor 48 rotates. The magnetic flux is generated in the coils L1 and L2 due to the rotation of the rotor 48. When the magnetic flux is generated, electromotive force is generated in the coils L1 and L2, so that the electromotive force is amplified, resulting in the A/D converter 702 (see FIG. 2) of the determination unit 70 detecting the impact. The inventors have found that preferably, the coil L1 (first coil) is used to detect the peak of the electromotive force, and the coil L2 (second coil) is used to input the drive pulse and determine the polarity. In this case, the CPU 61 controls the driving circuit 150 as follows.

Figure 32A:
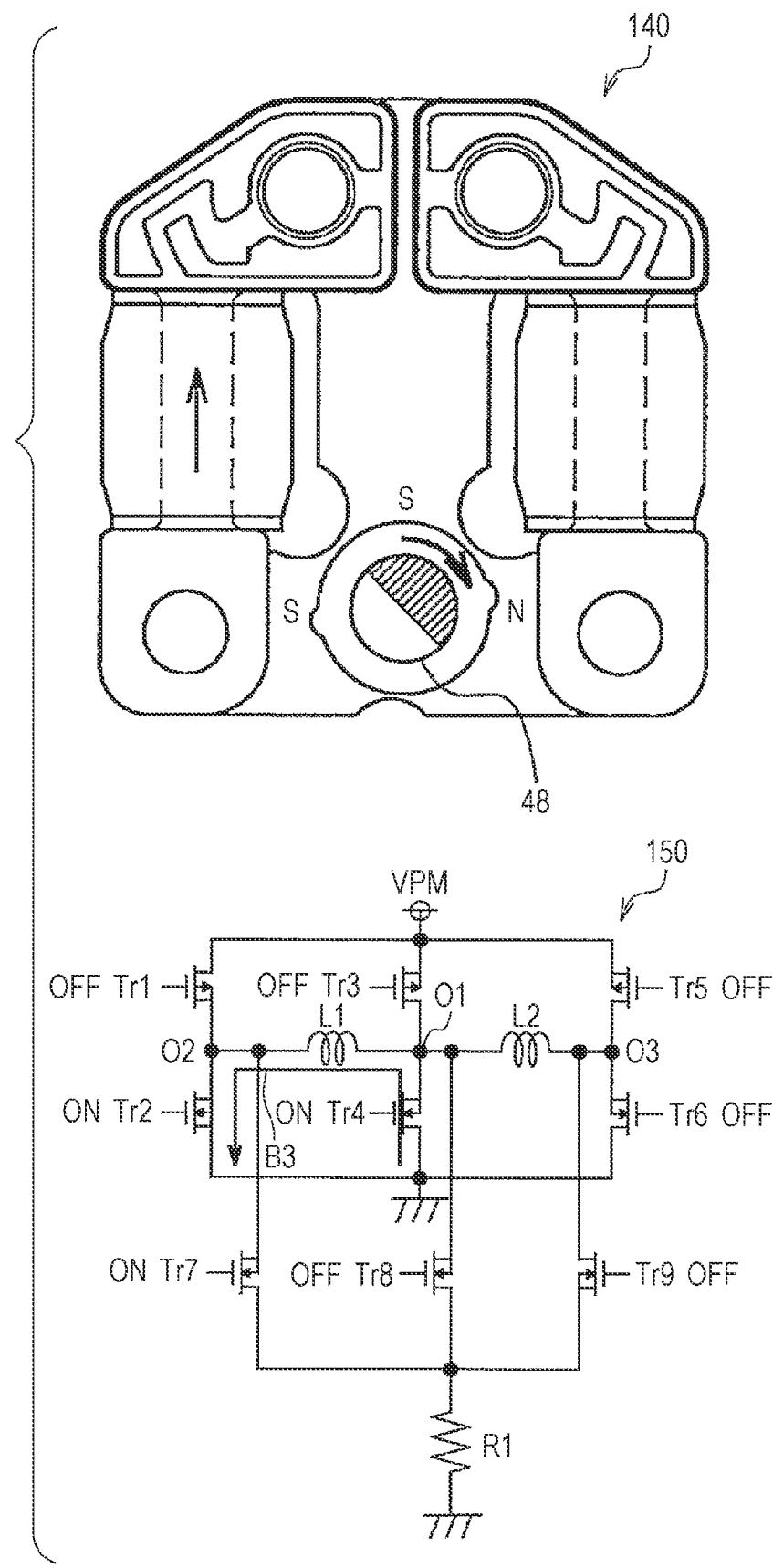
FIG. 32A is an explanatory diagram for illustrating detection of forward rotation of the rotor according to the third embodiment.
Figure 32B:
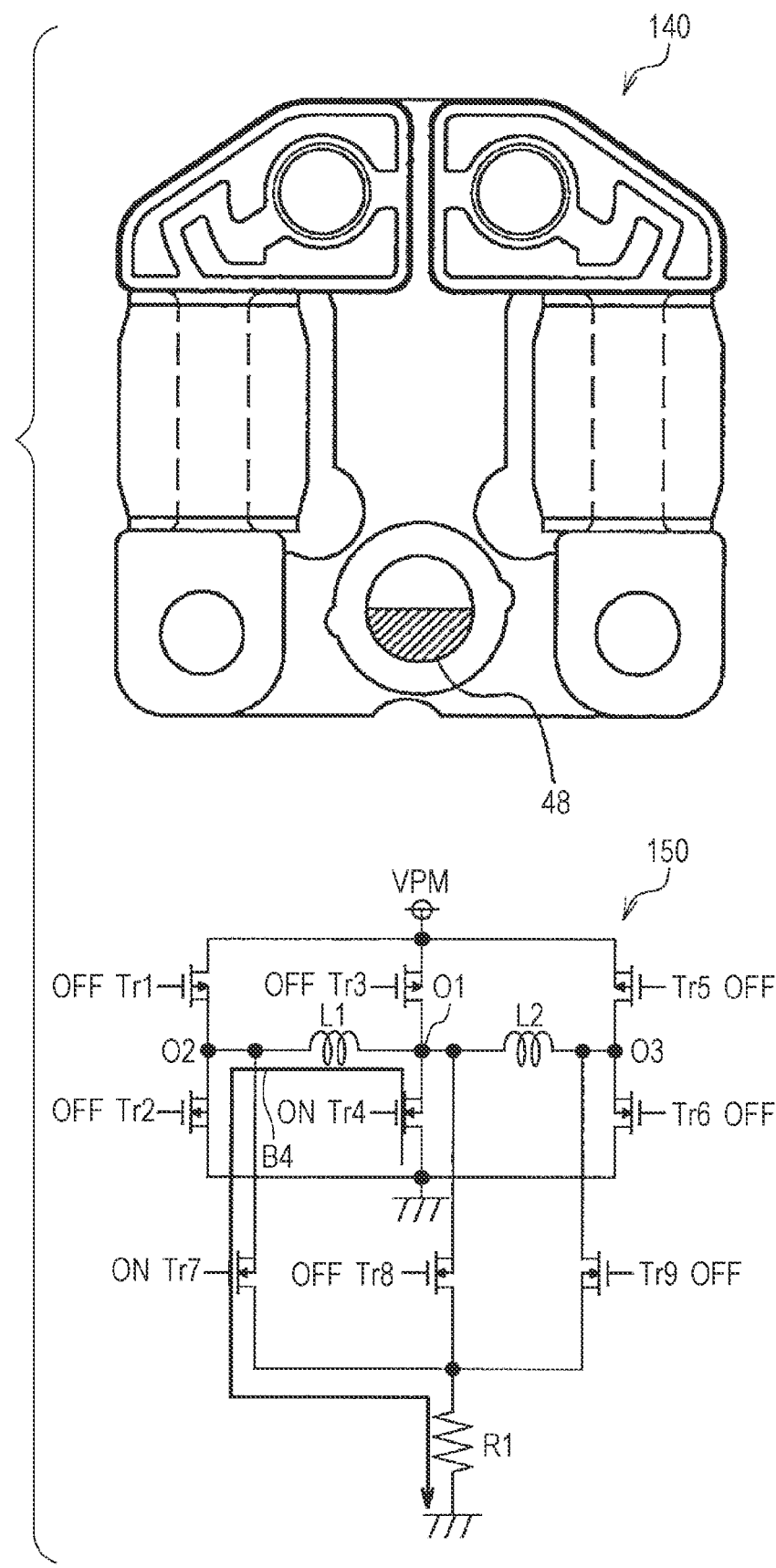
FIG. 32B is an explanatory diagram for illustrating detection of forward rotation of the rotor according to the third embodiment.

FIGS. 32A and 32B illustrate the case of detecting the forward rotation. In FIG. 32A, the CPU 61 has turned ON the switch elements Tr2, Tr4, and Tr7 and has turned OFF the switch elements Tr1, Tr3, Try, Tr6, and Tr8. The stepping motor 140 on the upper side in FIG. 32A indicates the position of the rotor 48, the magnetic pole generated in the center yoke 145 and the side yokes 144 and the 146, and the direction of the magnetic flux generated in the coil L1. The N pole of the rotor 48 is on the upper right side. The center yoke 145 and the side yoke 144 have the S pole, and the side yoke 146 has the N pole. When the rotor 48 rotates in the forward rotation direction, an upward magnetic flux is generated in the coil L1, electromotive force is generated in the direction from the connection point O1 to the connection point O2, and a current flows along a path B3. The path B3 is a path starting from the ground, passing through the switch element Tr4, the coil L1, and the switch element Tr2, and returning to the ground. Furthermore, in this case, the coil L2 is in a high impedance state.

Next, as illustrated in FIG. 32B, the CPU 61 turns OFF the switch element Tr2. Then, the current flowing through the coil L1 flows along a path B4. The path B4 is a path starting from the switch element Tr4 and flowing through the coil L1 to pass through the switch element Tr7 and the resistor R1.

The voltage across the resistor R1 is proportional to the current flowing through the coil L1. The coil L2 is in a high impedance state. In the stepping motor 140 on the upper side in FIG. 32B indicates the position of the rotor 48.

Figure 33A:
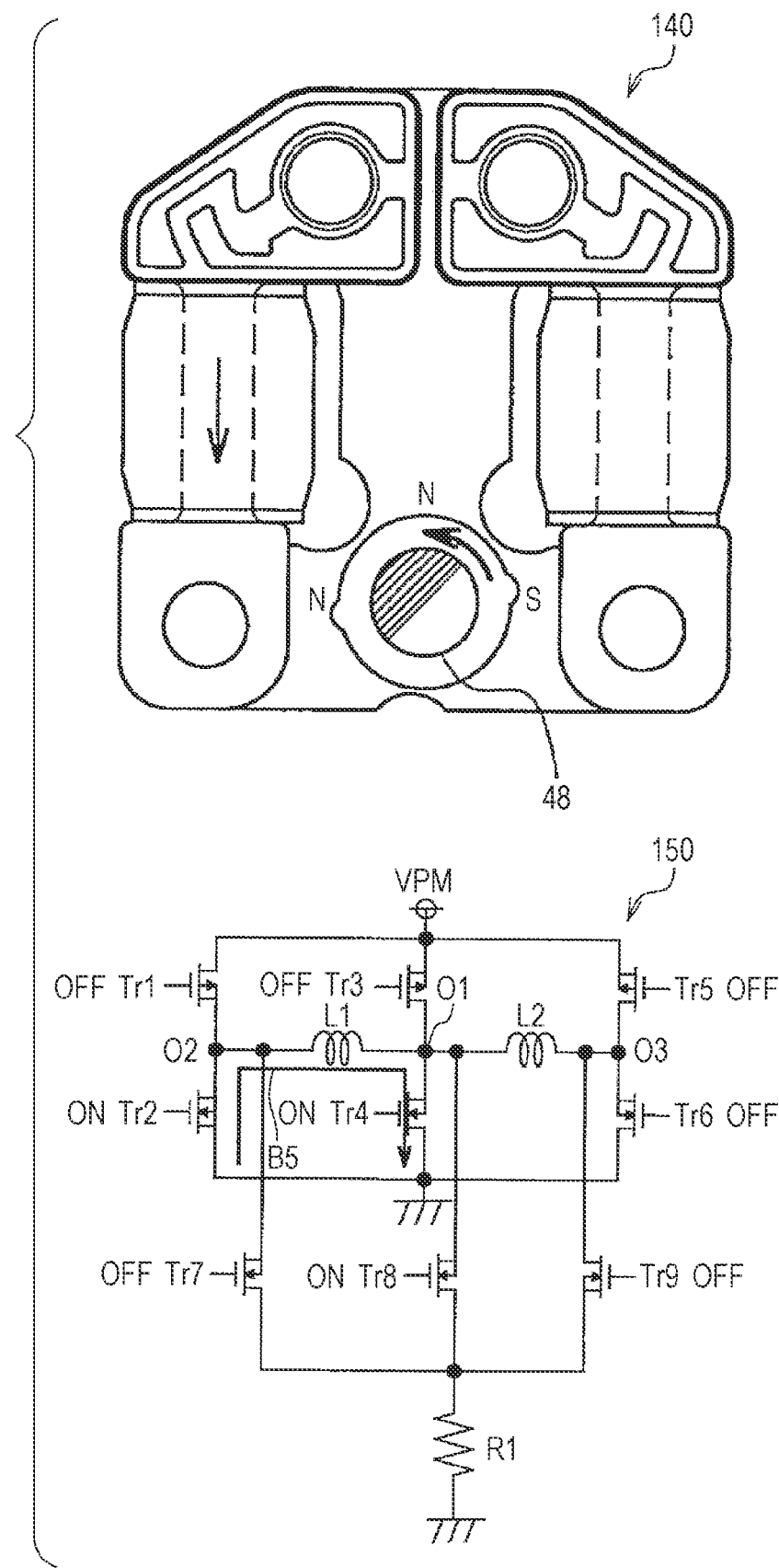
FIG. 33A is an explanatory diagram for illustrating detection of reverse rotation of the rotor according to the third embodiment.
Figure 33B:
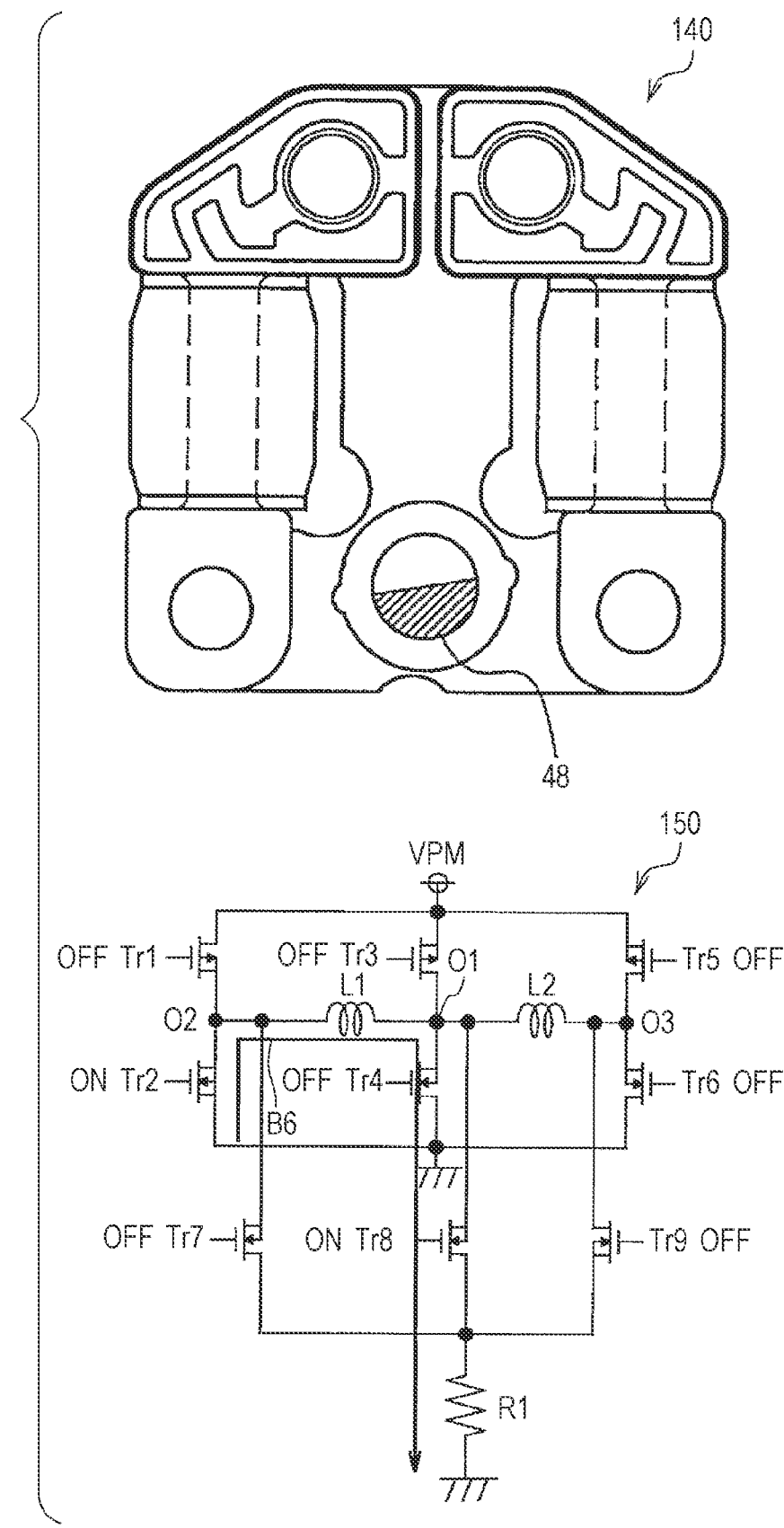
FIG. 33B is an explanatory diagram for illustrating detection of reverse rotation of the rotor according to the third embodiment.

FIGS. 33A and 33B illustrate a case of detecting the reverse rotation. In FIG. 33A, the CPU 61 has turned ON the switch elements Tr2, Tr4, and Tr8 and has turned OFF the switch elements Tr1, Tr3, Tr5, Tr6, and Tr7. The stepping motor 140 on the upper side in FIG. 33A indicates the position of the rotor 48, the magnetic pole generated in the center yoke 145 and the side yokes 144 and the 146, and the direction of the magnetic flux of the coil L1. The N pole of the rotor 48 is on the upper left side. The center yoke 145 and the side yoke 144 have the N pole, and the side yoke 146 has the S pole. When the rotor 48 rotates in the reverse direction, electromotive force is generated in the coil L1 in the direction from the connection point O2 to the connection point O1, and a current flows along a path B5. The path B5 is a path starting from the ground, passing through the switch element Tr2, the coil L1, and the switch element Tr4, and returning to the ground. Furthermore, in this case, the coil L2 is in a high impedance state.

Next, as illustrated in FIG. 33B, the CPU 61 turns OFF the switch element Tr4. Then, the current flowing through the coil L1 flows along a path B6. The path B6 is a path starting from the ground and flowing through the switch element Tr2, the coil L1, the switch element Tr8, and the resistor R1. The voltage across the resistor R1 is proportional to the current flowing through the coil L1. The coil L2 is in a high impedance state.

In the present embodiment, the CPU 61 repeats the operations in FIGS. 32A to 33B. When an impact occurs on the stepping motor 140, the A/D converter 702 of the determination unit 70 detects a pulse in the voltage across the resistor R1 at the timing illustrated in FIG. 32B or 33B. Thus, the electromotive force generated in the coil L1 can be detected.

Figure 34:
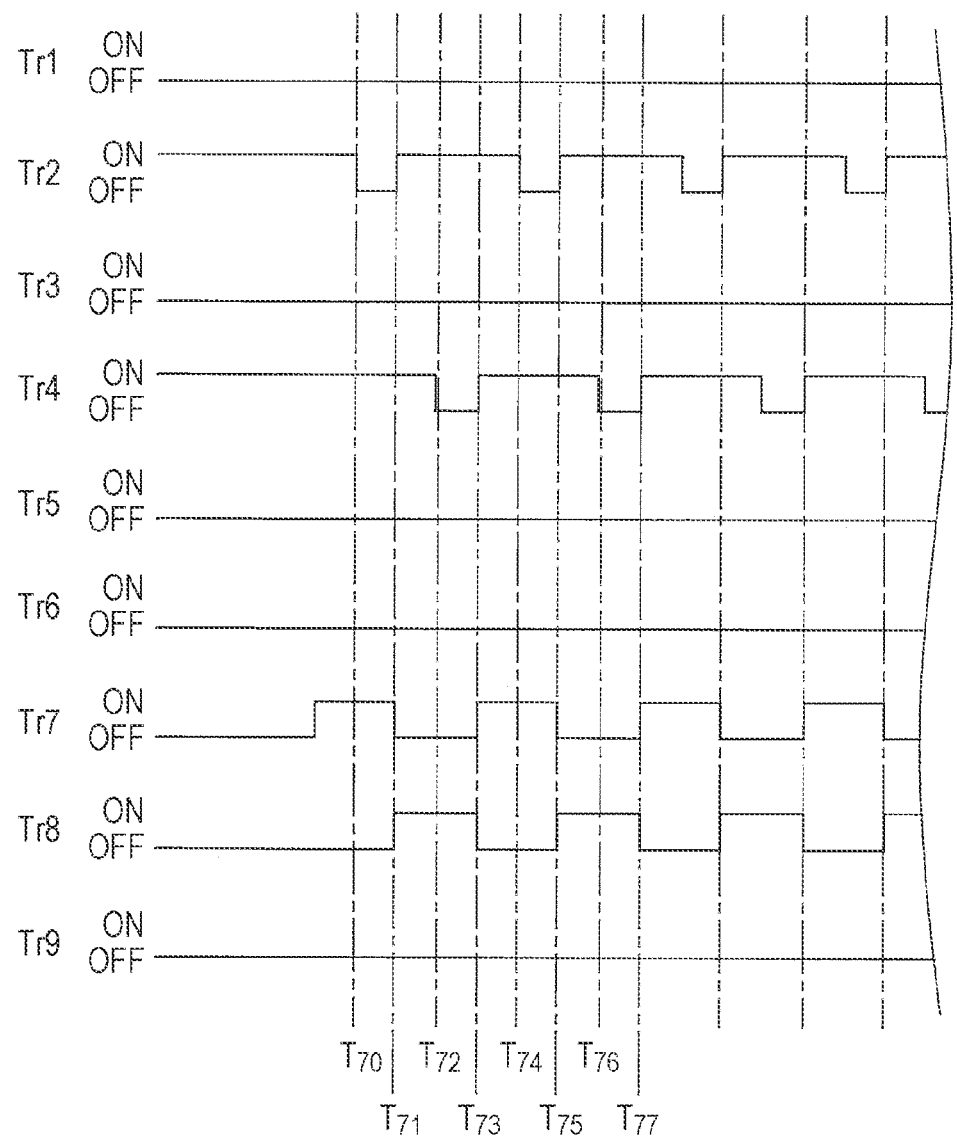
FIG. 34 is a timing chart illustrating operations of the switch elements in FIGS. 32A, 32B, 33A, and 33B.

FIG. 34 is a timing chart illustrating operations of the switch elements Tr1 to Tr8 in FIGS. 32A, 32B, 33A, and 33B.

Immediately before a time point T70, the switch elements Tr2, Tr4, and Tr7 are ON and the switch element Tr8 is OFF. This corresponds to the state of the switches illustrated in FIG. 32A.

At a time point T70, the switch element Tr2 is turned OFF. This corresponds to the state of the switches illustrated in FIG. 32B.

At a time point T71, the switch elements Tr2 and Tr8 are turned ON and the switch element Tr7 is turned OFF. Thus, the switch elements Tr2, Tr4, and Tr8 are ON, and the switch element Tr7 is OFF. This corresponds to the state of the switches illustrated in FIG. 33A.

At a time point T72, the switch element Tr4 is turned OFF. This corresponds to the state of the switches illustrated in FIG. 33B.

At a time point T73, the switch elements Tr4 and Tr7 are turned ON and the switch element Tr8 is turned OFF.

At time points T74 to T77 thereafter, the switches are in the same state as that at the time points T70 to T73. Thus, the states are repeatedly achieved.

In the impact detection, as illustrated in FIG. 34, the CPU 61 repeatedly achieves the states illustrated in FIGS. 32A and 32B and FIGS. 33A and 33B to detect a current generated due to an impact.

Overall Operation in Third Embodiment

Next, the overall operation of the present embodiment will be described with reference to FIGS. 35 to 42.

Figure 35:
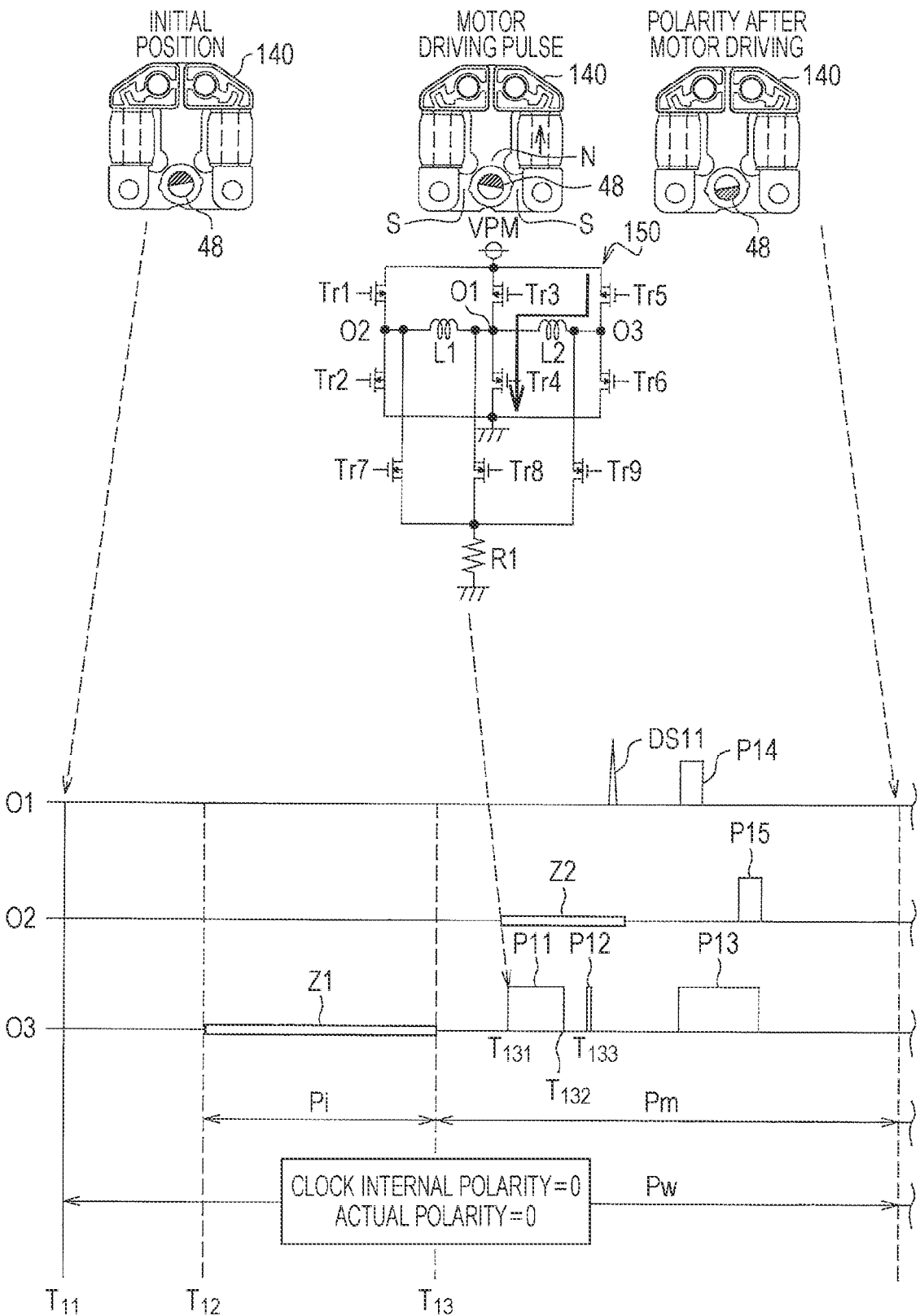
FIG. 35 is a timing chart illustrating a state where a drive pulse is input to the driving circuit.

FIG. 35 is a timing chart illustrating a state where a drive pulse P11 is input to the driving circuit 150. The same reference numerals are used for processing that is the same as that in the first embodiment, and the description on the processing is omitted as appropriate.

As illustrated in FIG. 35, at a time point T11, the CPU 61 enables the drive pulse and impact detection, and starts a section Pw in which the watch internal polarity is 0 and the actual polarity is also 0.

The stepping motor 140 on the upper left side in FIG. 35 indicates the initial position of the rotor 48 at the time point T11. The CPU 61 starts an impact detection operation at the time point T12.

An impact detection section Pi from the time point T12 to the time point T13 indicates a period during which the impact can be detected. The CPU 61 sets the connection point O3 to be in a high impedance state Z1 in the impact detection section Pi. The time point T13 indicates the timing of starting the operation of the stepping motor 140, and is the time point at which a motor drive section Pm starts.

The CPU 61 causes the pulse generation circuit 691 to apply the drive pulse P11 to the connection point O3 from a time point T131 to a time point T132, and then apply a detection pulse P12 to the connection point O3 at a time point T133. At this time, the connection point O2 of the coil L1 is in a high impedance state Z2. The stepping motor 140 on the center upper side in FIG. 35 indicates the position of the rotor 48 at the time point T131. The driving circuit 150 on the lower side illustrates a path through which the drive pulse P11 flows.

The detection result of a detection signal DS11, which is a current pulse flowing from the connection point O1 to the ground, is HIGH. In this case, the CPU 61 determines that the rotation of the rotor 48 by the drive pulse P11 has failed, and at a time point T135, applies a correction pulse P13 to the connection point O3, applies a correction pulse P14 to the connection point O1, and then applies the correction pulse P15 to the connection point O2 at a time point T136.

FIG. 36 is an explanatory diagram illustrating the relationship between the detection signal of the rotation detection and the detection result. As illustrated in FIG. 36, detection of LOW current pulse flowing from the connection point O1 to the ground as the in-phase detection at the time when the polarity is 0 with the detection pulse P12 applied from the connection point O3 to the connection point O1 indicates that the rotor 48 has rotated (rotation OK). On the other hand, the detection of a HIGH current pulse flowing from the connection point O1 to the ground indicates that the rotor 48 has not rotated (rotation NG).

Detection of HIGH current pulse flowing from the connection point O3 to the ground as reverse phase detection at the time when the polarity is 0 with the detection pulse P12 applied from the connection point O1 to the connection point O3 indicates that the rotor 48 has rotated (rotation OK). On the other hand, the detection of a LOW current pulse flowing from the connection point O3 to the ground indicates that the rotor 48 has not rotated (rotation NG).

Detection of LOW current pulse flowing from the connection point O1 to the ground as the in-phase detection at the time when the polarity is 1 with the detection pulse P12 applied from the connection point O3 to the connection point O1 indicates that the rotor 48 has rotated (rotation OK). On the other hand, the detection of a HIGH current pulse flowing from the connection point O1 to the ground indicates that the rotor 48 has not rotated (rotation NG).

Detection of HIGH current pulse flowing from the connection point O3 to the ground as the reverse phase detection at the time when the polarity is 1 with the detection pulse P12 applied from the connection point O1 to the connection point O3 indicates that the rotor 48 has rotated (rotation OK). On the other hand, the detection of a LOW current pulse flowing from the connection point O3 to the ground indicates that the rotor 48 has not rotated (rotation NG).

Referring back to FIG. 35, the description will be further given. At a time point T135, the polarity is 0, and the detection pulse P12 is applied from the connection point O3 to the connection point O1. Thereafter, a HIGH current pulse flowing from the connection point O1 to the ground is detected. This indicates that the rotor 48 has not rotated. Therefore, the CPU 61 causes the pulse generation circuit 691 to apply the correction pulse P13 to the connection point O3 and apply the correction pulse P14 to the connection point O1 at the time point T135, and then apply the correction pulse P15 to the connection point O2 at the time point T136. The stepping motor 140 on the upper right side in FIG. 35 indicates the position of the rotor 48 after the series of sequences has been completed.

Figure 37:
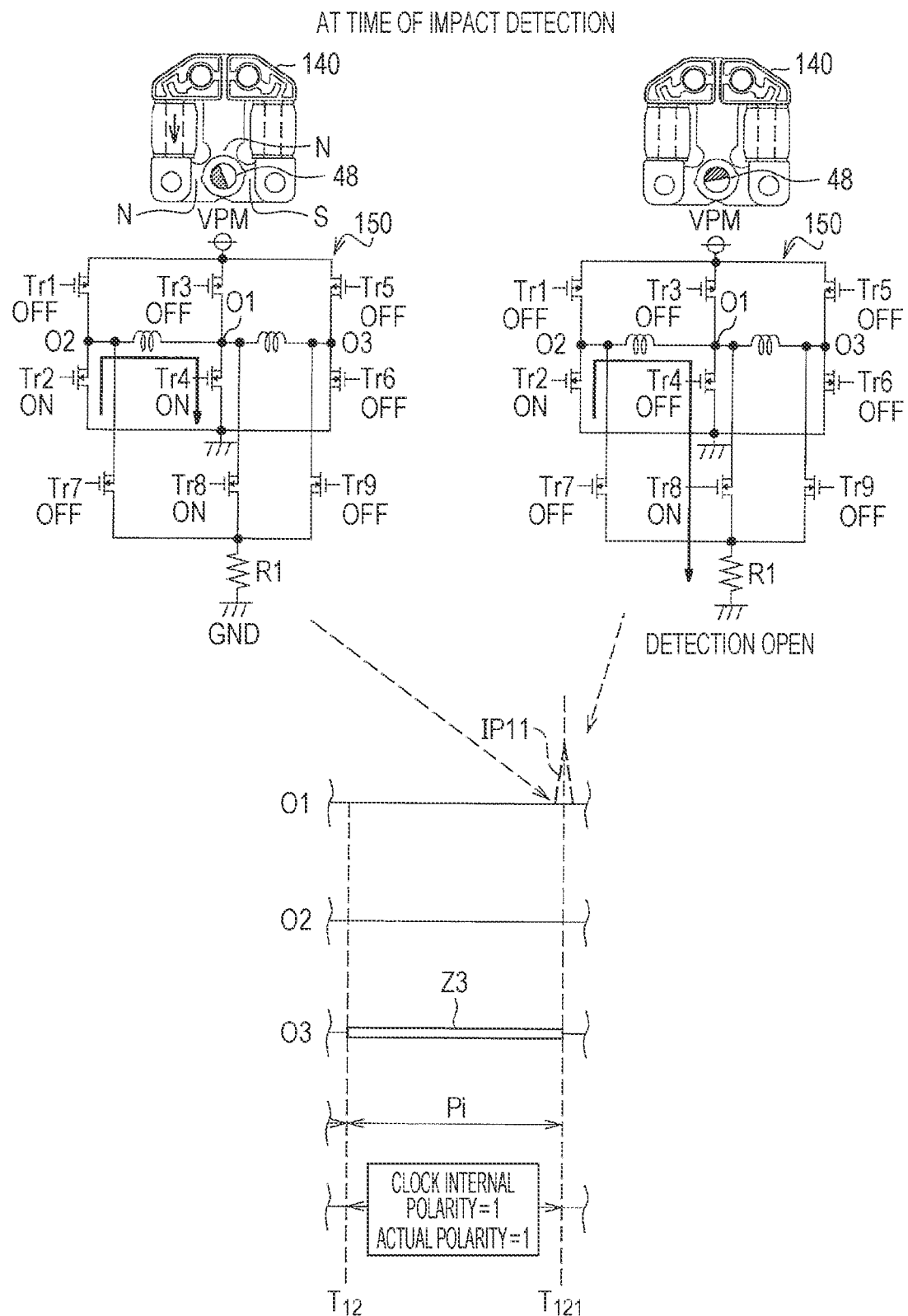
FIG. 37 is an explanatory diagram illustrating a timing chart when the A/D converter of a determination unit detects the impact on the stepping motor.

Next, the impact detection will be described with reference to the timing chart of FIG. 37. FIG. 37 is an explanatory diagram illustrating a timing chart when the A/D converter 702 of the determination unit 70 detects the impact on the stepping motor 140.

As illustrated in FIGS. 32 to 34, the CPU 61 controls the driving circuit 150 to detect the impact on the stepping motor 140. The stepping motor 140 on the upper left side in FIG. 37 indicates the position of the rotor 48 after the reception of an impact. The driving circuit 150 on the lower side indicates a path of the current flowing due to the electromotive force generated in the coil L1 in response to the reception of impact. The stepping motor 140 on the upper left side in FIG. 37 indicates the position of the rotor 48 at a time point T121 after the detection of the impact. The driving circuit 150 on the lower side indicates the path of the current IP11 flowing from the coil L1 to the ground through the resistor R1.

FIG. 37 illustrates detection of the current IP11 flowing from the connection point O1 to the ground through the resistor R1 at the time point T121. The current IP11 is a current based on the first peak of electromotive force.

When the current IP11 flows from the connection point O1 toward the ground, the watch internal polarity is 1 and the actual polarity is 1. Furthermore, in the period from the time point T12 to the time point T121, the connection point O3 is in the high impedance state.

Furthermore, the CPU 61 stops software processing (operation), upon detecting an impact with the current pulse (current IP11). In this case, the CPU 61 stops the software processing (operation) at and after the time point T121.

FIG. 38 is an explanatory diagram illustrating the relationship between the polarity before the impact and a terminal at the time of detection. As illustrated in FIG. 38, when the polarity before the impact is 0 and the current pulse (current IP11) flowing from the connection point O1 to the ground is detected, it is determined that there is a possibility of reverse rotation shift. On the other hand, when the polarity before the impact is 0 and the current pulse (current IP11) flowing from the connection point O2 to the ground is detected, it is determined that there is a possibility of forward rotation shift. When the polarity before the impact is 1 and the current pulse (current IP11) flowing from the connection point O1 to the ground is detected, it is determined that there is a possibility of forward rotation shift. On the other hand, when the polarity before the impact is 1 and the current pulse (current IP11) flowing from the connection point O2 to the ground is detected, it is determined that there is a possibility of reverse rotation shift.

In FIG. 37, the polarity before the impact is 1 and the current IP11 flowing from the connection point O1 to the ground is detected, and thus it is determined that there is a possibility of forward rotation shift. In the third embodiment, the relationship between the polarity before the impact and the terminal at the time of detection is opposite to that in the first embodiment.

Figure 39:
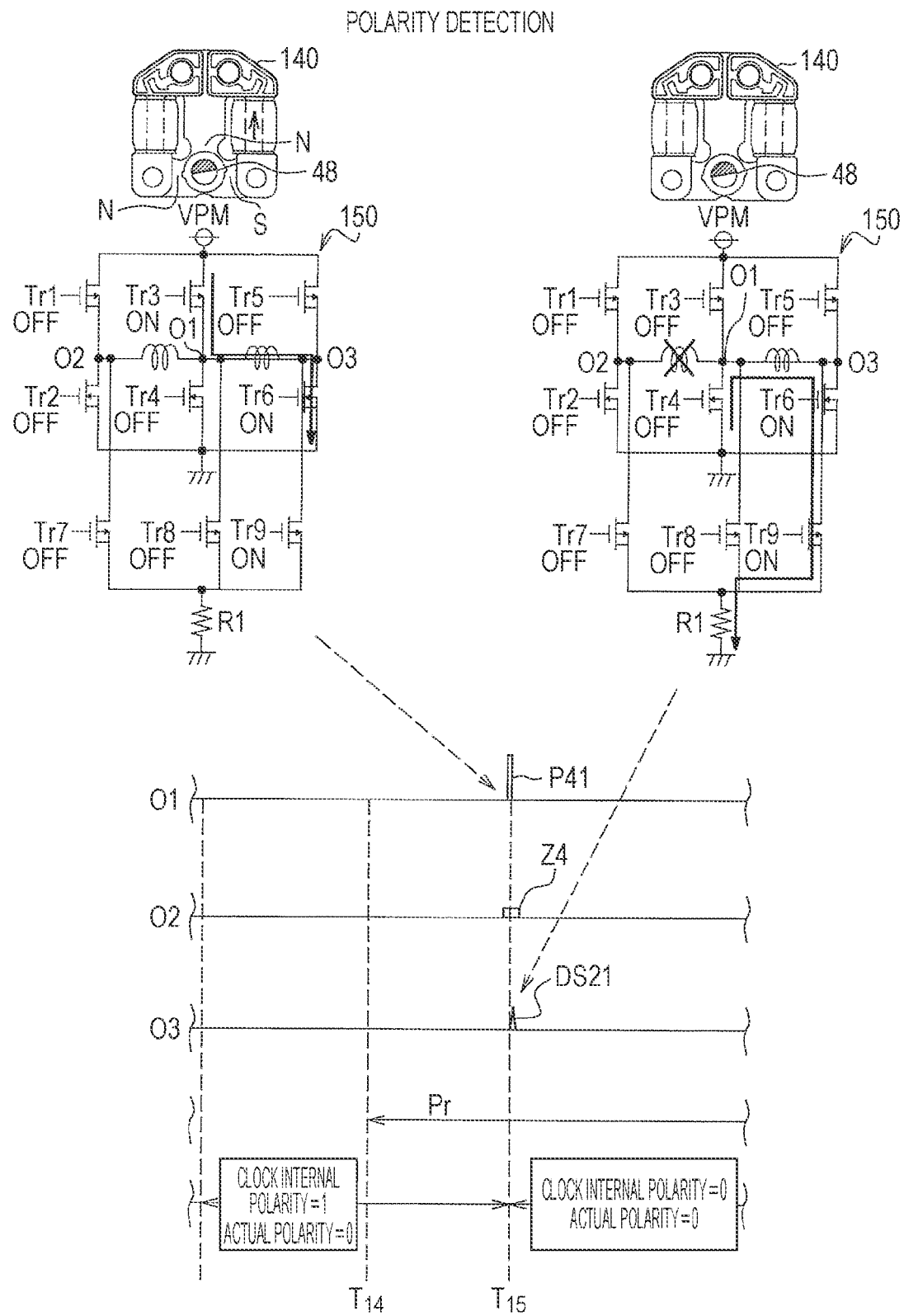
FIG. 39 is a timing chart illustrating a case where the CPU according to the third embodiment executes polarity detection for the driving circuit.

Next, the polarity detection will be described with reference to a timing chart in FIG. 39. FIG. 39 is a timing chart illustrating a case where the CPU 61 executes polarity detection for the driving circuit 150. The stepping motor 140 on the upper left side in FIG. 39 indicates the position of the rotor 48 immediately before the time point T15. The driving circuit 150 therebelow indicates the state where the detection pulse P41 is applied.

The stepping motor 140 on the upper right side in FIG. 39 indicates the position of the rotor 48 at the time point T15. The driving circuit 150 therebelow indicates a state where the detection signal DS21 is detected.

After the impact, at the time point T14, the CPU 61 resumes the software processing, whereby a software processing resume period Pr starts. At the time point T15 during the software processing resume period Pr, the CPU 61 causes the pulse generation circuit 691 to apply the detection pulse P41 to the connection point O1 of the driving circuit 150. Then, the detection signal DS21 is detected as a LOW current pulse flowing from the connection point O3 to the ground.

FIG. 40 is an explanatory diagram illustrating the relationship between the polarity and the detection result at the time of polarity detection according to the third embodiment. If the polarity before the impact is 0 and the detection pulse is applied from the connection point O3 to the connection point O1 (in-phase detection) and then a HIGH current pulse flowing from the connection point O1 to the ground is detected, the CPU 61 determines that the watch internal polarity matches the actual polarity. On the other hand, when the LOW current pulse flowing from the connection point O1 to the ground is detected, the CPU 61 determines that the watch internal polarity does not match the actual polarity.

If the polarity before the impact is 0 and the detection pulse is applied from the connection point O1 to the connection point O3 (reverse phase detection) and then a LOW current pulse flowing from the connection point O3 to the ground is detected, the CPU 61 determines that the watch internal polarity matches the actual polarity. On the other hand, when a HIGH current pulse flowing from the connection point O3 to the ground is detected, the CPU 61 determines that the watch internal polarity does not match the actual polarity.

If the polarity before the impact is 1 and the detection pulse is applied from the connection point O3 to the connection point O1 (in-phase detection) and then a HIGH current pulse flowing from the connection point O1 to the ground is detected, the CPU 61 determines that the watch internal polarity matches the actual polarity. On the other hand, when the LOW current pulse flowing from the connection point O1 to the ground is detected, the CPU 61 determines that the watch internal polarity does not match the actual polarity.

If the polarity before the impact is 1 and the detection pulse is applied from the connection point O1 to the connection point O3 (reverse phase detection) and then a LOW current pulse flowing from the connection point O3 to the ground is detected, the CPU 61 determines that the watch internal polarity matches the actual polarity. On the other hand, when a HIGH current pulse flowing from the connection point O3 to the ground is detected, the CPU 61 determines that the watch internal polarity does not match the actual polarity.

FIG. 41 is an explanatory diagram illustrating whether the polarity before the impact and the current polarity are shifted from each other, based on the detection result in FIG. 40. Specifically, in FIG. 40, when the polarity before the impact matches the actual polarity, the polarity is unchanged from that before the impact. Thus, there is no shift in polarity. On the other hand, when the polarities do not match, the polarity has changed from that before the impact. Thus, there is a shift in polarity.

Referring back to FIG. 39, the description will be further given. At the time point T15, the polarity before the impact (internal polarity) is 1, the detection pulse P41 for the in-phase detection is applied from the connection point O1, and then the detection signal DS2 as the LOW current pulse flowing from the connection point O3 to the ground is detected. The CPU 61 determines that the watch internal polarity does not match the actual polarity as illustrated in FIG. 40, and also determines that the polarities are shifted from each other as illustrated in FIG. 41.

Figure 42:
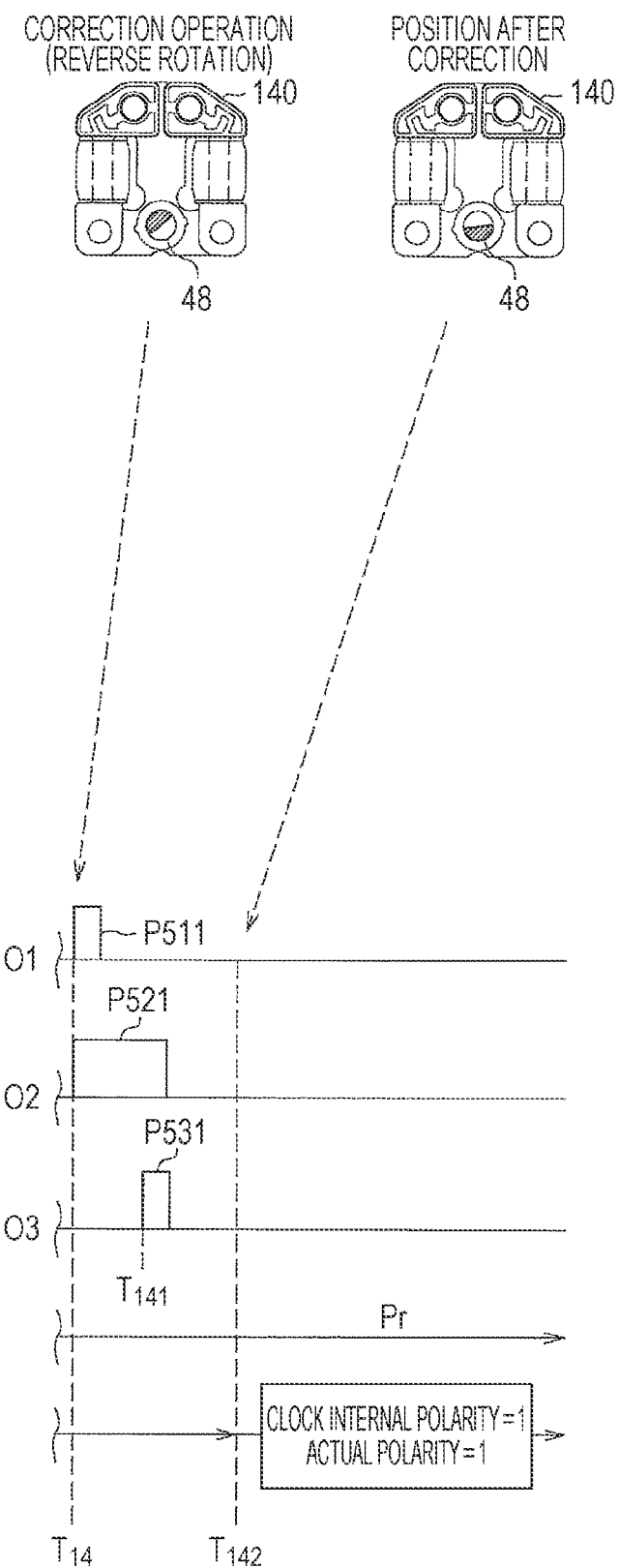
FIG. 42 is a timing chart illustrating processing of correcting the polarity because the rotor of the stepping motor according to the third embodiment has forward rotation shift in the forward rotation direction.

FIG. 42 is a timing chart illustrating processing of correcting the polarity because the rotor 48 of the stepping motor 140 has forward rotation shift in the forward rotation direction.

All the timings in FIG. 42 are within the software processing resume period Pr. At the time point T14, the CPU 61 causes the pulse generation circuit 691 to apply a pulse P511 to the connection point O1 and a pulse P521 to the connection point O2. At the time point T141, the CPU 61 causes the pulse generation circuit 691 to apply the pulse P531 to the connection point O3, and corrects the position of the rotor 48. The corrected position of the rotor 48 of the stepping motor 4 at the time point T142 is illustrated in the upper right part in FIG. 42. The three pulses P511, P521, and P531 are correctively referred to as a correcting reverse rotation pulse.

CPU Processing According to Third Embodiment

Figure 43:
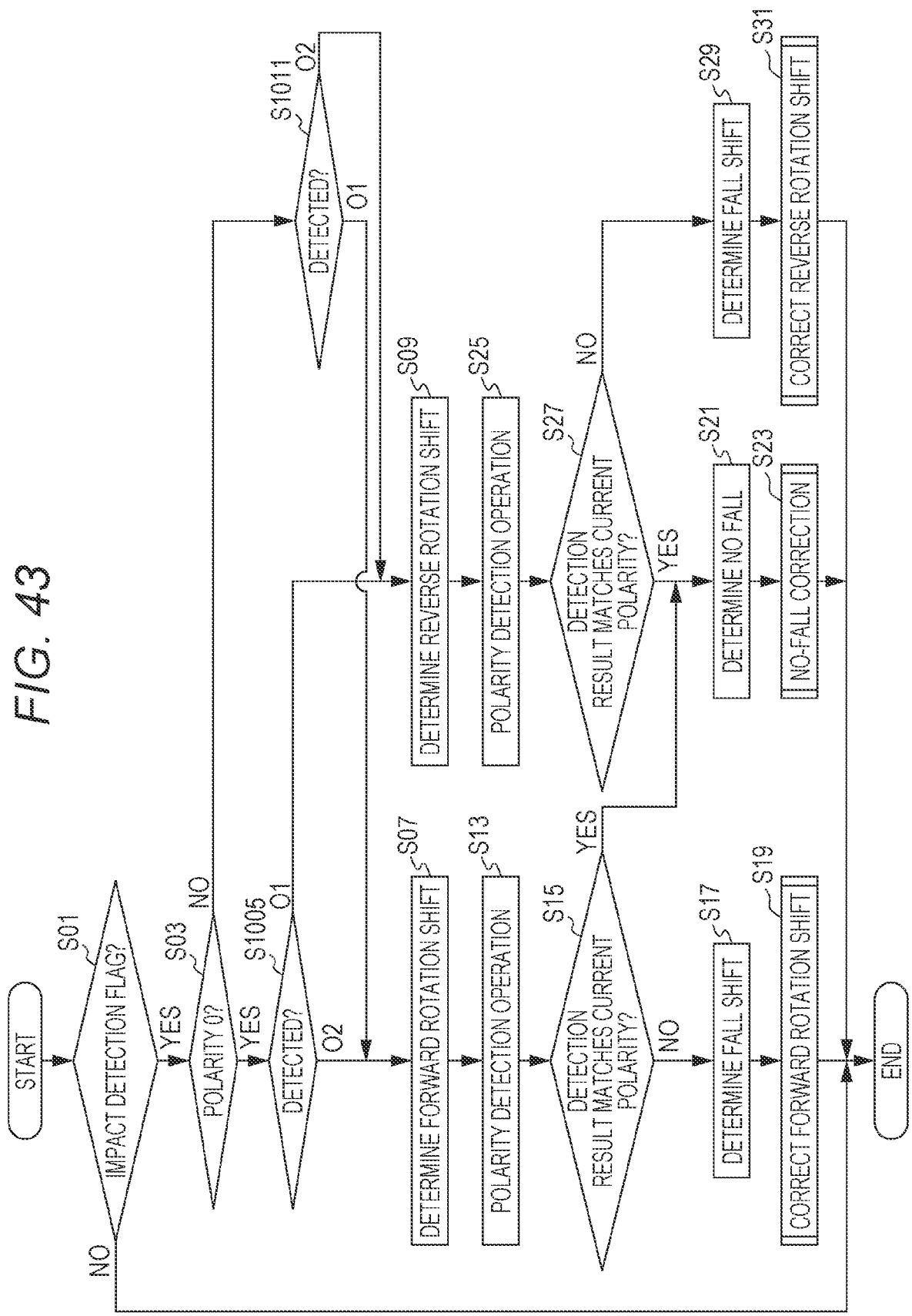
FIG. 43 is a flowchart illustrating the correction processing executed by a CPU in the third embodiment.

Next, correction processing executed by the CPU 61 will be described with reference to a flowchart. FIG. 43 is a flowchart illustrating the correction processing executed by the CPU 61 in the third embodiment.

The flow chart according to the third embodiment in FIG. 43 is different from the flow chart according to the first embodiment in FIG. 17 in that the determination direction of the detection terminal (connection point) that detects a fall is opposite between the connection point O1 and the connection point O2. Therefore, the same reference numerals are used for the other processing that is the same as that described above, and the description of the other processing will be omitted as appropriate.

The CPU 61 determines whether the impact detection flag (which is the above-mentioned fall flag) is set (step S01). When the impact detection flag is determined to be not set (NO) in step S01, the CPU 61 ends the processing in FIG. 43.

In the determination in step S01, when the impact detection flag is set (YES), the CPU 61 determines whether the watch internal polarity is 0 (step S03).

When the watch internal polarity is determined to be 0 in the determination in step S03 (YES), the CPU 61 determines from which of the connection points O1 and O2 the current pulse flowing to the ground has been detected (step S1005).

When the current pulse flowing from the connection point O2 to the ground is detected in the determination in step S1005, the CPU 61 determines that the rotor 48 may have forward rotation shift (step S07).

On the other hand, when the current pulse flowing from the connection point O1 to the ground is detected in the determination in step S1005, the CPU 61 determines that the rotor 48 may have reverse rotation shift (step S09).

When the watch internal polarity is not determined to be 0 in the determination in step S03 (NO), the CPU 61 determines from which of the connection points O1 and O2 the current pulse flowing to the ground has been detected (step S1011).

When the current pulse flowing from the connection point O2 to the ground is detected in the determination in step S1011, the CPU 61 determines that the rotor 48 may have reverse rotation shift (step S09).

On the other hand, when the current pulse flowing from the connection point O1 to the ground is detected in the determination in step S05, the CPU 61 determines that the rotor 48 may have forward rotation shift (step S07).

Thereafter, the processing in steps S07 to S31 is the same as that in steps S07 to S31 illustrated in FIG. 17.

As described above, the electronic watch 1 according to the third embodiment may adopt a dual core type motor as the stepping motor.

With the electronic watches 1 according to the first to the third embodiments, the position of a pointer can be corrected at a low cost, without a need for an additional substrate bearing a light receiving element (phototransistor, for example) for executing a pointer position detection operation. Furthermore, wheels close to the pinhole arranged at the highest density need not to be sandwiched by a light emitting element (an LED for example) and a light receiving element of the additional substrate and the main substrate, and thus the product thickness would not be directly increased by the thicknesses of the parts and the additional substrate. Therefore, a thin product can be obtained.

Furthermore, a pointer position detection unit may be further provided by combining the light emitting element and the light receiving element. For example, the wheel train mechanism 3 may partially be provided with a light transmitting portion through which light can transmit, and a light emitting element and a light receiving element may be further provided. Thus, a configuration may be achieved where the light emitting element emits light onto the wheel train mechanism 3 and the light receiving element detects the light transmitted through the light transmitting portion.

With such a configuration, the position of the light transmitting portion can be determined by the timing at which the light receiving element detects light, so that the rotational position of the wheel train mechanism 3 can be determined. Furthermore, by detecting the rotational position of the wheel train mechanism 3, the position of the pointer can be reliably corrected.

Thus, in the electronic watch 1, for example, a pointer position detection unit can correct the pointer position after the impact has been detected. According to this method, the position of the pointer can be corrected even if the pointer position is shifted by two steps or more.

(Modification)

The present invention is not limited to the above embodiments, and modifications can be made without departing from the spirit of the present invention. For example, the present invention is not limited to the electronic watch 1, and may be applied to any pointer device for example.

The invention claimed is:

1. A pointer device comprising:
    a pointer;
    a stepping motor comprising a coil and configured to drive the pointer;
    a driving circuit configured to drive the stepping motor;
    a detection unit configured to detect electromotive force generated in the coil due to an impact; and
    at least one processor configured to control driving of the driving circuit, wherein the at least one processor is configured to:
        determine a direction of a first peak of the electromotive force detected by the detection unit;
        determine a total number of a second or subsequent peaks of the electromotive force detected by the detection unit, wherein each of the second or subsequent peaks of the electromotive force is a peak in the opposite direction to a peak immediately preceding the each of the second or subsequent peaks;
        determine whether the total number is an even number;
        determine whether the pointer is shifted in a shifting direction corresponding to the direction of a first peak of the electromotive force based on the direction of the first peak of the electromotive force and a result of the determination of whether the total number is the even number; and
        upon determining that the pointer is shifted in the shifting direction, correct a position of the pointer in accordance with the shifting direction.

2. The pointer device according to claim 1,
    wherein the at least one processor is configured to not correct the position of the pointer when the first peak of the electromotive force detected by the detection unit is in a positive direction, and the peak to be counted is detected for an odd number of times, and correct the position of the pointer when the peak to be counted is detected for an even number of times.

3. The pointer device according to claim 2,
    wherein the at least one processor is configured to, when the first peak of the electromotive force detected by the detection unit is in the positive direction and the peak to be counted is detected for an even number of times, move the pointer in a reverse rotation direction to correct the position of the pointer.

4. The pointer device according to claim 1,
    wherein the at least one processor is configured to correct the position of the pointer when the first peak of the electromotive force detected by the detection unit is in a negative direction and the peak to be counted is detected for an odd number of times, and does not correct the position of the pointer when the peak to be counted is detected for an even number of times.

5. The pointer device according to claim 4,
    wherein the least one processor is configured to, when the first peak of the electromotive force detected by the detection unit is in the negative direction and the peak to be counted is detected for an odd number of times, move the pointer in a forward rotation direction to correct the position of the pointer.

6. The pointer device according to claim 1,
    wherein the at least one processor is configured to correct the position of the pointer by moving the position of the pointer by one step.

7. The pointer device according to claim 1,
wherein the stepping motor comprises a rotor having a magnet, and
wherein the at least one processor is configured to:
  determine whether the pointer is shifted in the direction due to the impact based on a polarity of the magnet; and
  correct the position of the pointer.

8. The pointer device according to claim 7,
wherein the at least one processor is configured to output a pulse to the coil, and determine the polarity of the magnet based on a value of a current flowing through the coil.

9. The pointer device according to claim 8,
wherein the stepping motor comprises:
  a first coil configured to detect a peak of the electromotive force; and
  a second coil configured to input a drive pulse and determine the polarity.

10. The pointer device according to claim 9,
wherein the at least one processor is configured to alternately put the first coil and the second coil in a high impedance state.

11. The pointer device according to claim 1 further comprising a pointer position detection unit,
wherein the pointer position detection unit comprises a light emitting element, a light receiving element, and a wheel train mechanism,
wherein the light emitting element is configured to emit light to a light transmitting portion of the wheel train mechanism, and
wherein the light receiving element is configured to receive the light transmitted through the light transmitting portion to detect a rotational position of the wheel train mechanism and correct the position of the pointer.

12. An electronic watch comprising the pointer device according to claim 1.

13. A control method for a pointer device, the pointer device comprising:
  a pointer;
  a stepping motor comprising a coil and configured to drive the pointer;
  a driving circuit configured to drive the stepping motor;
  a detection unit configured to detect electromotive force generated in the coil due to an impact; and
  at least one processor configured to control driving of the driving circuit, the control method comprising, the at least one processor performing:
    determining a direction of a first peak of the electromotive force detected by the detection unit;
    determining a total number of a second or subsequent peaks of the electromotive force detected by the detection unit, wherein each of the second or subsequent peaks of the electromotive force is a peak in the opposite direction to a peak immediately preceding the each of the second or subsequent peaks;
    determining whether the total number is an even number;
    determining whether the pointer is shifted in a shifting direction corresponding to the direction of a first peak of the electromotive force based on the direction of the first peak of the electromotive force and a result of the determination of whether the total number is the even number; and
    upon determining that the pointer is shifted in the shifting direction, correcting a position of the pointer in accordance with the shifting direction.

14. A non-transitory computer-readable recording medium storing a program for controlling a pointer device,
  a pointer;
  a stepping motor comprising a coil and configured to drive the pointer;
  a driving circuit configured to drive the stepping motor;
  a detection unit configured to detect electromotive force generated in the coil due to an impact; and
  at least one processor, wherein the program causes the at least one processor to execute:
    determining a direction of a first peak of the electromotive force detected by the detection unit;
    determining a total number of a second or subsequent peaks of the electromotive force detected by the detection unit, wherein each of the second or subsequent peaks of the electromotive force is a peak in the opposite direction to a peak immediately preceding the each of the second or subsequent peaks;
    determining whether the total number is an even number;
    determining whether the pointer is shifted in a shifting direction corresponding to the direction of a first peak of the electromotive force based on the direction of the first peak of the electromotive force and a result of the determination of whether the total number is the even number; and
    upon determining that the pointer is shifted in the shifting direction, correcting a position of the pointer in accordance with the shifting direction.

* * * * *